US006601930B2

(12) United States Patent
Tiramani et al.

(10) Patent No.: US 6,601,930 B2

(45) Date of Patent: *Aug. 5, 2003

(54) ROLLING CONTAINERS ASSEMBLY

(75) Inventors: Paolo B. Tiramani, Greenwich, CT (US); Soohyun Ham, Stamford, CT (US); John A. Bozak, Greenwich, CT (US)

(73) Assignee: 500 Group Inc., Greenwich, CT (US)

( * ) Notice: Subject to any disclaimer, the term of this patent is extended or adjusted under 35 U.S.C. 154(b) by 8 days.

This patent is subject to a terminal disclaimer.

(21) Appl. No.: 10/075,441

(22) Filed: Feb. 15, 2002

(65) Prior Publication Data

US 2002/0074905 A1 Jun. 20, 2002

Related U.S. Application Data

(63) Continuation of application No. 09/731,780, filed on Dec. 8, 2000, now Pat. No. 6,347,847, which is a continuation of application No. 09/433,352, filed on Nov. 4, 1999, now Pat. No. 6,176,559, which is a continuation of application No. 09/017,197, filed on Feb. 2, 1998, now abandoned.

(51) Int. Cl.[7] ............................ A47B 87/02; B62B 1/26

(52) U.S. Cl. ....................... 312/108; 312/902; 312/244; 312/237; 312/249.1; 190/18 A; 280/47.19; 280/47.35

(58) Field of Search ................................ 312/108, 244, 312/249.1, 249.8, 249.12, 237, 293.1, 293.3, 298, 301, 302, 308, 902; 280/37, 47.24, 47.18, 47.26, 47.35, 47.19, 652, 655, 655.1; 190/18 A, 15.1, 108; 220/4.27; 206/372, 373, 821

(56) References Cited

U.S. PATENT DOCUMENTS

| | | | | |
|---|---|---|---|---|
| 2,883,731 A | | 4/1959 | Wells | 280/47.26 |
| 2,893,749 A | | 7/1959 | Simonsen | 280/47.19 |
| 2,905,480 A | | 9/1959 | Giovannelli | 280/34 |
| 2,964,328 A | | 12/1960 | Muir | 280/47.19 |
| 3,087,740 A | | 4/1963 | Mitty et al. | 280/47.26 |
| 3,118,685 A | | 1/1964 | Jordan | 280/47.19 |
| 3,170,710 A | | 2/1965 | Rachman | 280/79.2 |
| 3,436,093 A | | 4/1969 | Ruffley, Jr. | 280/47.27 |
| 3,520,583 A | | 7/1970 | Case | 312/277 |
| 3,552,579 A | * | 1/1971 | Simon | 312/108 X |
| 3,715,148 A | | 2/1973 | Beals | 312/209 |

(List continued on next page.)

FOREIGN PATENT DOCUMENTS

| | | |
|---|---|---|
| DE | 3146452 | 6/1983 |
| DE | 3510307 | 9/1986 |
| DE | G 88 13 391 | 3/1989 |
| DE | 4017742 | 3/1991 |
| EP | 0319969 | 6/1989 |
| EP | 0555553 B1 | 8/1994 |
| EP | 0640447 | 3/1995 |
| GB | 2199544 | 7/1988 |
| GB | 2214899 A | 9/1989 |
| GB | 2247655 | 3/1992 |
| NL | 1006914 | 2/1999 |
| WO | WO 91/05720 | 5/1991 |
| WO | WO 94/15824 | 7/1994 |
| WO | WO 98/52811 | 11/1998 |

OTHER PUBLICATIONS

Craftsman Catalog "Power & Hand Tools", pp. 7 & 13, Jan. 1994.*

*Primary Examiner*—James O. Hansen

(74) *Attorney, Agent, or Firm*—Pillsbury Winthrop LLP

(57) ABSTRACT

A rolling containers assembly including (a) a base cabinet including wheels and a pulling handle for locomoting the rolling containers assembly; and (b) at least one additional cabinet being removably connectable on top of the base cabinet.

14 Claims, 28 Drawing Sheets

U.S. PATENT DOCUMENTS

| | | | | | |
|---|---|---|---|---|---|
| 3,771,848 | A | | 11/1973 | Claywell | |
| 3,874,531 | A | | 4/1975 | Mayo | |
| 3,876,223 | A | | 4/1975 | O'Reilley et al. | 280/47.19 |
| 3,891,230 | A | * | 6/1975 | Mayer | 190/18 A X |
| 3,908,831 | A | | 9/1975 | Brendgord | 211/88 |
| 3,990,653 | A | | 11/1976 | Marcell | |
| 4,046,391 | A | | 9/1977 | Restad et al. | 280/5.24 |
| 4,118,048 | A | | 10/1978 | Spranger et al. | 280/47.35 |
| 4,281,843 | A | | 8/1981 | Johnson et al. | 280/47.26 |
| 4,457,527 | A | | 7/1984 | Lowery | 280/47.19 |
| 4,662,515 | A | * | 5/1987 | Newby, Sr. | 312/902 X |
| 4,691,397 | A | | 9/1987 | Netzer | 5/507 |
| 4,759,560 | A | | 7/1988 | Virgulti | 280/47.26 |
| 4,936,594 | A | | 6/1990 | Oliver, III | 280/47.19 |
| D311,622 | S | | 10/1990 | Swig | D34/25 |
| 4,976,450 | A | | 12/1990 | Ellefson | 280/79.11 |
| 4,989,291 | A | | 2/1991 | Parent | 15/315 |
| 5,011,013 | A | * | 4/1991 | Meisner et al. | 312/902 X |
| 5,013,055 | A | | 5/1991 | Labrum | 280/47.19 |
| 5,016,946 | A | * | 5/1991 | Reznikov et al. | 312/108 |
| 5,016,948 | A | | 5/1991 | Welch et al. | |
| 5,069,466 | A | | 12/1991 | Propst | 280/79.3 |
| 5,113,546 | A | | 5/1992 | Parent | 15/315 |
| D327,353 | S | | 6/1992 | Shetterly | D34/25 |
| 5,193,706 | A | * | 3/1993 | Hanna et al. | 312/902 X |
| 5,207,723 | A | | 5/1993 | Newby, Sr. | 312/249.11 |
| 5,213,351 | A | | 5/1993 | Chen | 280/47.19 |
| 5,240,264 | A | | 8/1993 | Williams | 280/40 |
| 5,244,265 | A | | 9/1993 | Chiang | 312/107 |
| 5,275,349 | A | | 1/1994 | Tussing | |
| 5,281,020 | A | | 1/1994 | Romick | 312/308 |
| 5,294,196 | A | | 3/1994 | Chen | 312/263 |
| 5,330,263 | A | * | 7/1994 | Wilkinson | 312/328 |
| D349,989 | S | | 8/1994 | Shetterly | D34/25 |
| 5,368,143 | A | * | 11/1994 | Pond et al. | 280/37 X |
| 5,378,005 | A | | 1/1995 | Norton | 280/47.26 |
| 5,423,651 | A | | 6/1995 | Dinverno | 312/249.8 X |
| 5,425,545 | A | | 6/1995 | McCusker | 280/30 |
| 5,437,502 | A | | 8/1995 | Warnick et al. | 312/244 |
| 5,452,908 | A | | 9/1995 | Bencic | 280/47.35 |
| 5,482,162 | A | | 1/1996 | Dickinson | 206/373 |
| 5,482,605 | A | | 1/1996 | Taylor | |
| 5,484,160 | A | | 1/1996 | Ek | 280/659 |
| 5,503,571 | A | | 4/1996 | Cheslock | 206/372 X |
| 5,513,066 | A | * | 4/1996 | Berman | 280/47.26 X |
| 5,518,139 | A | * | 5/1996 | Trower et al. | 206/379 X |
| 5,518,258 | A | | 5/1996 | Cox | 280/30 |
| 5,518,310 | A | | 5/1996 | Ellman et al. | 312/249.12 |
| D371,663 | S | | 7/1996 | Muller-Deisig et al. | D34/25 |
| 5,533,799 | A | | 7/1996 | Nickolaus, Jr. | 312/249.12 |
| 5,577,745 | A | | 11/1996 | Birk | 280/47.19 |
| 5,588,659 | A | | 12/1996 | Boes et al. | 280/47.19 |
| 5,603,559 | A | * | 2/1997 | Yemini | 312/244 X |
| 5,634,649 | A | | 6/1997 | Breining et al. | 280/47.35 |
| 5,641,170 | A | | 6/1997 | Helm | |
| 5,642,898 | A | | 7/1997 | Wise | |
| D382,997 | S | | 9/1997 | Carr et al. | D3/274 |
| 5,664,652 | A | * | 9/1997 | Shamah | 190/15.1 X |
| 5,664,853 | A | | 9/1997 | Nickolaus, Jr. | 312/249.12 |
| 5,680,932 | A | * | 10/1997 | Dickinson et al. | 312/902 X |
| 5,683,097 | A | * | 11/1997 | Fenton et al. | 280/655.1 |
| 5,685,421 | A | | 11/1997 | Gilmore | |
| 5,704,496 | A | | 1/1998 | Latta | 211/70.6 |
| 5,738,423 | A | * | 4/1998 | Alfaro | 312/290 |
| 5,762,411 | A | * | 6/1998 | Yemini | 312/902 X |
| 5,799,958 | A | | 9/1998 | Bishop | 280/47.26 |
| 5,823,337 | A | * | 10/1998 | Yunger et al. | 206/315.11 |
| 5,857,757 | A | * | 1/1999 | Bieker et al. | 312/902 X |
| D404,916 | S | | 2/1999 | Dickinson et al. | D3/281 |
| 5,893,572 | A | | 4/1999 | Parks | 280/47.18 |
| 5,906,381 | A | | 5/1999 | Hovatter | 280/47.18 |
| 5,971,119 | A | * | 10/1999 | Chi | 190/108 |
| 5,988,658 | A | | 11/1999 | Ritchie et al. | 280/47.26 |
| 6,050,660 | A | | 4/2000 | Gurley | 312/249.1 |
| 6,086,073 | A | | 7/2000 | Tisbo et al. | 280/47.26 |
| 6,170,559 | B1 | | 1/2001 | Barge | |

* cited by examiner

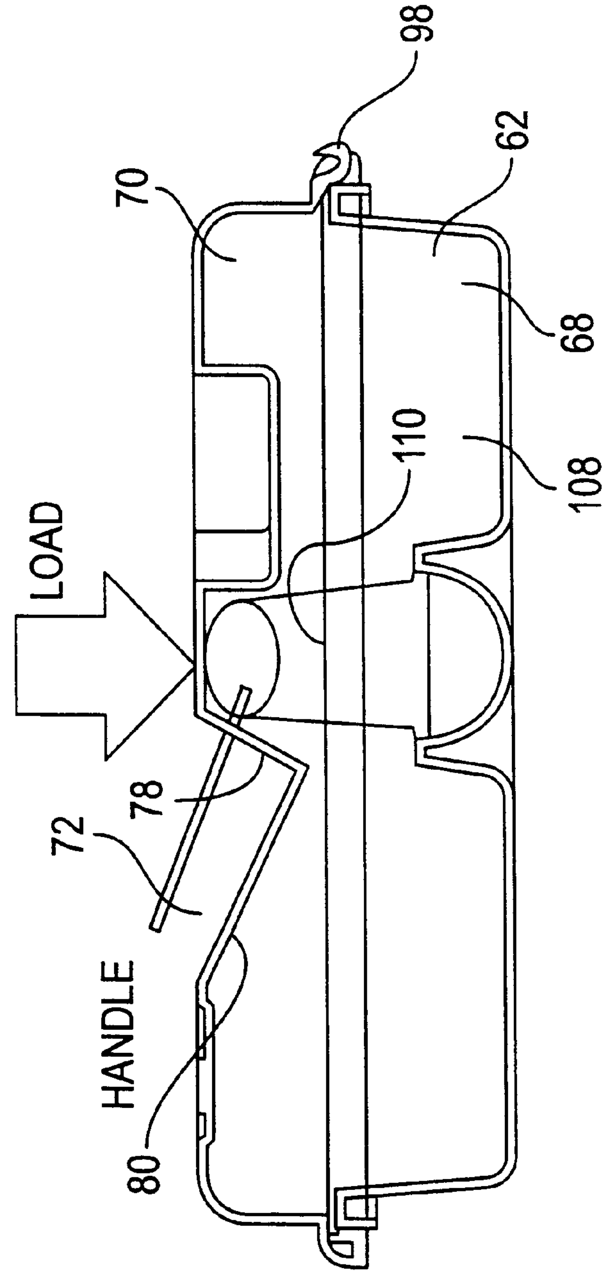
FIG. 20
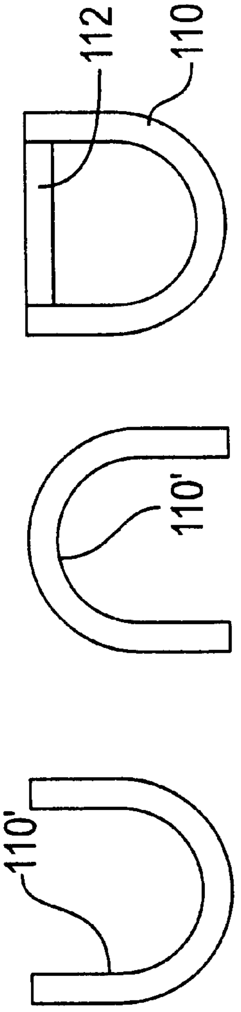
FIG. 21A (PRIOR ART)
FIG. 21B (PRIOR ART)
FIG. 21C

ROLLING CONTAINERS ASSEMBLY

This application is a continuation of U.S. application Ser. No. 09/731,780, filed Dec. 8, 2000, now U.S. Pat. No. 6,347,847, which is a continuation of U.S. application Ser. No. 09/433,352, filed Nov. 4, 1999, now U.S. Pat. No. 6,176,559, which is a continuation of U.S. application Ser. No. 09/017,197, filed Feb. 2, 1998, now abandoned.

FIELD AND BACKGROUND OF THE INVENTION

The present invention relates to a rolling containers assembly and, more particularly, to a vertically deployed modular rolling workshop having a retractable/extendible handle, which is easily assembled/disassembled.

Working in situ requires a plurality of working tools to be brought to the working location.

Conventional tool boxes are typically used for that purpose, however, their locomotion as individual pieces is inconvenient.

There is thus a widely recognized need for, and it would be highly advantageous to have, a modular rolling workshop devoid of the above limitation.

Additional advantages of the modular rolling workshop according to the present invention are described with respect to its specific embodiments hereinbelow.

SUMMARY OF THE INVENTION

According to the present invention there is provided a rolling containers assembly for storing working tools.

According to further features in preferred embodiments of the invention described below, the rolling containers assembly comprising (a) a base cabinet including wheels and a pulling handle for locomoting the rolling containers assembly; and (b) at least one additional cabinet being removably connectable on top of the base cabinet.

According to still further features in the described preferred embodiments the handle is extendible.

According to still further features in the described preferred embodiments the at least one additional cabinet is selected from the group consisting of a drawers assembly and a toolcase.

According to still further features in the described preferred embodiments the base cabinet includes a reel.

According to still further features in the described preferred embodiments the at least one additional cabinet is a modular unit.

According to still further features in the described preferred embodiments the at least one additional cabinet snaps onto the base cabinet.

According to still further features in the described preferred embodiments the toolcase includes a case and an openable cover.

According to still further features in the described preferred embodiments the cover is formed with an external groove usable in supporting rectangular and round objects.

According to still further features in the described preferred embodiments the groove is asymmetrical in cross section.

According to still further features in the described preferred embodiments the groove is formed between a first wall and a second wall of the cover deployed in a V shape, the first wall is deployed 63±15 degrees with respect to the cover, the second wall is deployed 27±15 degrees with respect to the cover, whereas the first and second walls are deployed 90 degrees with respect to one another.

According to still further features in the described preferred embodiments the groove is formed with grip ribs on at least a section thereof.

According to still further features in the described preferred embodiments the cover is formed with underlying strengthening ribs.

According to still further features in the described preferred embodiments the underlying strengthening ribs are deployed crosswise with respect to one another and obliquely with respect to an edge of the cover, such that triangle shapes are formed along the edge.

According to still further features in the described preferred embodiments the underlying strengthening ribs are deployed 90 degrees crosswise with respect to one another and 45 degrees with respect to an edge of the cover.

According to still further features in the described preferred embodiments the cover is formed with external protrusions deployed above the underlying strengthening ribs, the external protrusions serve for at least partially disguising sink marks associated with the ribs.

According to still further features in the described preferred embodiments the external protrusions have a diamond shape.

According to still further features in the described preferred embodiments the cover includes a carrying handle.

According to still further features in the described preferred embodiments the carrying handle is foldable.

According to still further features in the described preferred embodiments the toolcase includes at least one latch for securing the cover to the case when closed.

According to still further features in the described preferred embodiments the toolcase includes front sides and back, the sides taper toward the back.

According to still further features in the described preferred embodiments the front is curved.

According to still further features in the described preferred embodiments the toolcase includes a tray deployable within the case.

According to still further features in the described preferred embodiments the tray includes a tray-handle.

According to still further features in the described preferred embodiments toolcase includes a foldable carrying handle having side arms, the tray includes a tray-handle, the tray-handle nests between the side arms of the carrying handle of the cover.

According to still further features in the described preferred embodiments the drawers assembly includes a casing and at least one translating drawer translatably engaged by the casing.

According to still further features in the described preferred embodiments the at least one drawer translates over rails connected to the casing.

According to still further features in the described preferred embodiments all of the at least one drawer are securable close via a single securing member.

According to still further features in the described preferred embodiments the handle is extendible, the single securing member is attached to the handle, such that when the handle is retracted the securing member secured all of the at least one drawer closed.

According to still further features in the described preferred embodiments the base cabinet includes a casing to which the handle and the wheels are engaged and a flipping bin.

According to still further features in the described preferred embodiments the flipping bin is rotatable with respect to the casing and has an upper opening.

According to still further features in the described preferred embodiments the casing is formed with an upper rim, the rim is supplemented with holes which serve for attaching strings for effecting carriage of desired items on the top of the base cabinet when the at least one additional cabinet is removed.

According to still further features in the described preferred embodiments the handle is formed with additional holes which further serve for attaching strings for effecting the carriage of the desired items on the top of the base cabinet when the at least one additional cabinet is removed.

According to still further features in the described preferred embodiments the base cabinet includes a reel rotatably attached to the casing.

According to still further features in the described preferred embodiments the reel is removable.

According to still further features in the described preferred embodiments the casing is supplemented with at least two elastic bands designed for engaging desired items along a side thereof.

According to still further features in the described preferred embodiments the flipping bin is rotatably connected to the casing via a hinge located such that the bin opens when reaches beyond a center of gravity point and closes when is before the center of gravity point.

According to still further features in the described preferred embodiments the pulling handle is detachable.

According to still further features in the described preferred embodiments the at least one additional cabinet is selected from the group consisting of a clamshell style case and carousel organizer.

According to still further features in the described preferred embodiments provided is a rolling containers assembly for storing working tools comprising (a) a base cabinet including wheels for locomoting the rolling containers assembly; and (b) at least one additional cabinet being removably connectable on top of the base cabinet, the at least one additional cabinet including a pulling handle for effecting the locomotion.

According to still further features in the described preferred embodiments the at least one additional cabinet is selected from the group consisting of a clamshell style case and carousel organizer.

The present invention successfully addresses the shortcomings of the presently known configurations by providing a modular rolling containers assembly featuring a retractable/extendible back handle. Additional advantages of the present invention are described hereinunder.

BRIEF DESCRIPTION OF THE DRAWINGS

The invention herein described, by way of example only, with reference to the accompanying drawings, wherein:

FIG. 20 is a side view of the tray and cover of the toolcase of the rolling containers assembly according to the present invention;

FIGS. 21*a*, 21*b* and 21*c* are schematic cross sectional views of two prior art tray handles, and a tray handle according to the present invention;

DESCRIPTION OF THE PREFERRED EMBODIMENTS

Figure 1:
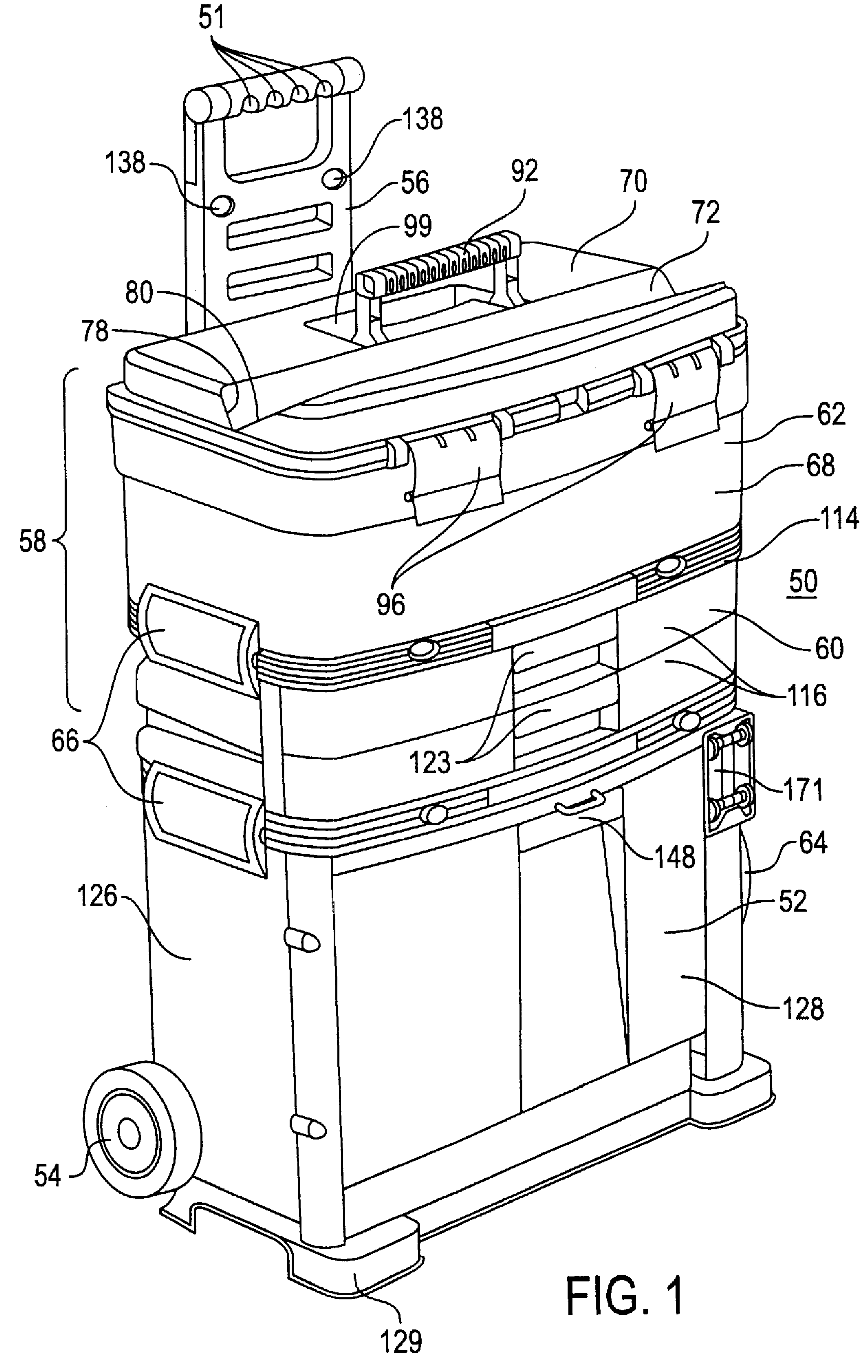
FIG. 1 is a perceptive front view of a rolling containers assembly according to the present invention.
Figure 2:
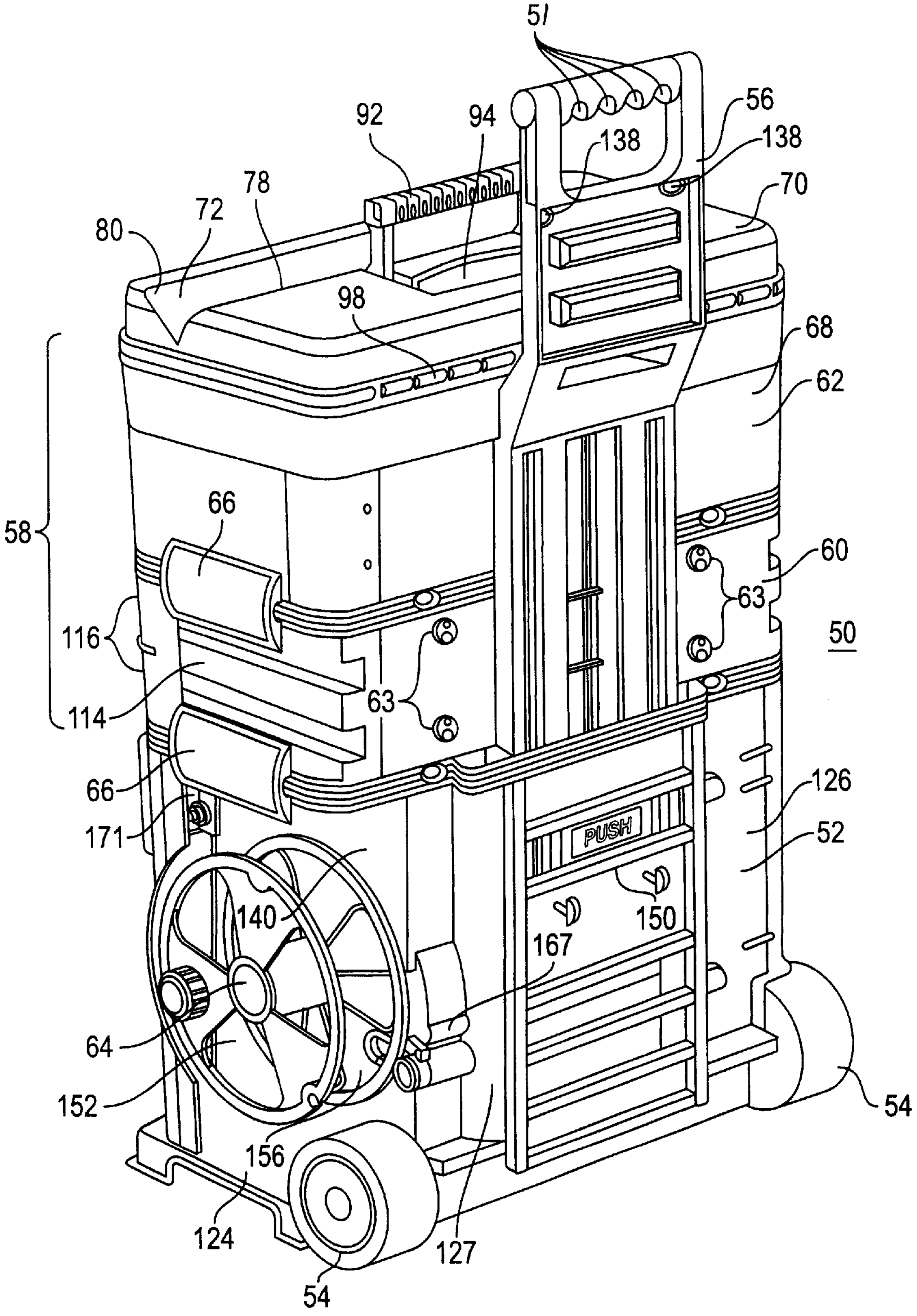
FIGS. 2 and 3 are perceptive rear views of the rolling containers assembly shown in FIG. 1.
Figure 3:
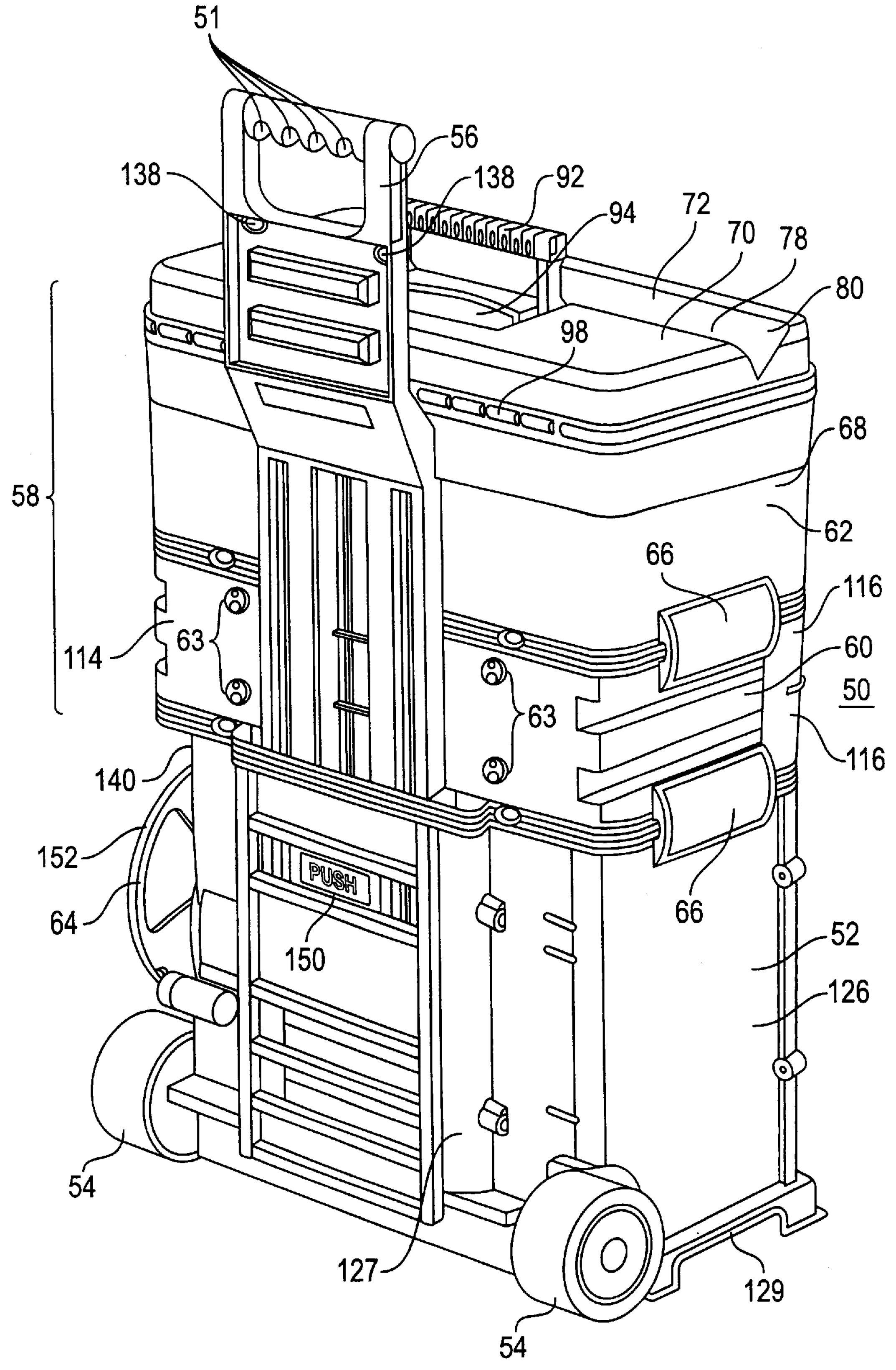
Figure 4:
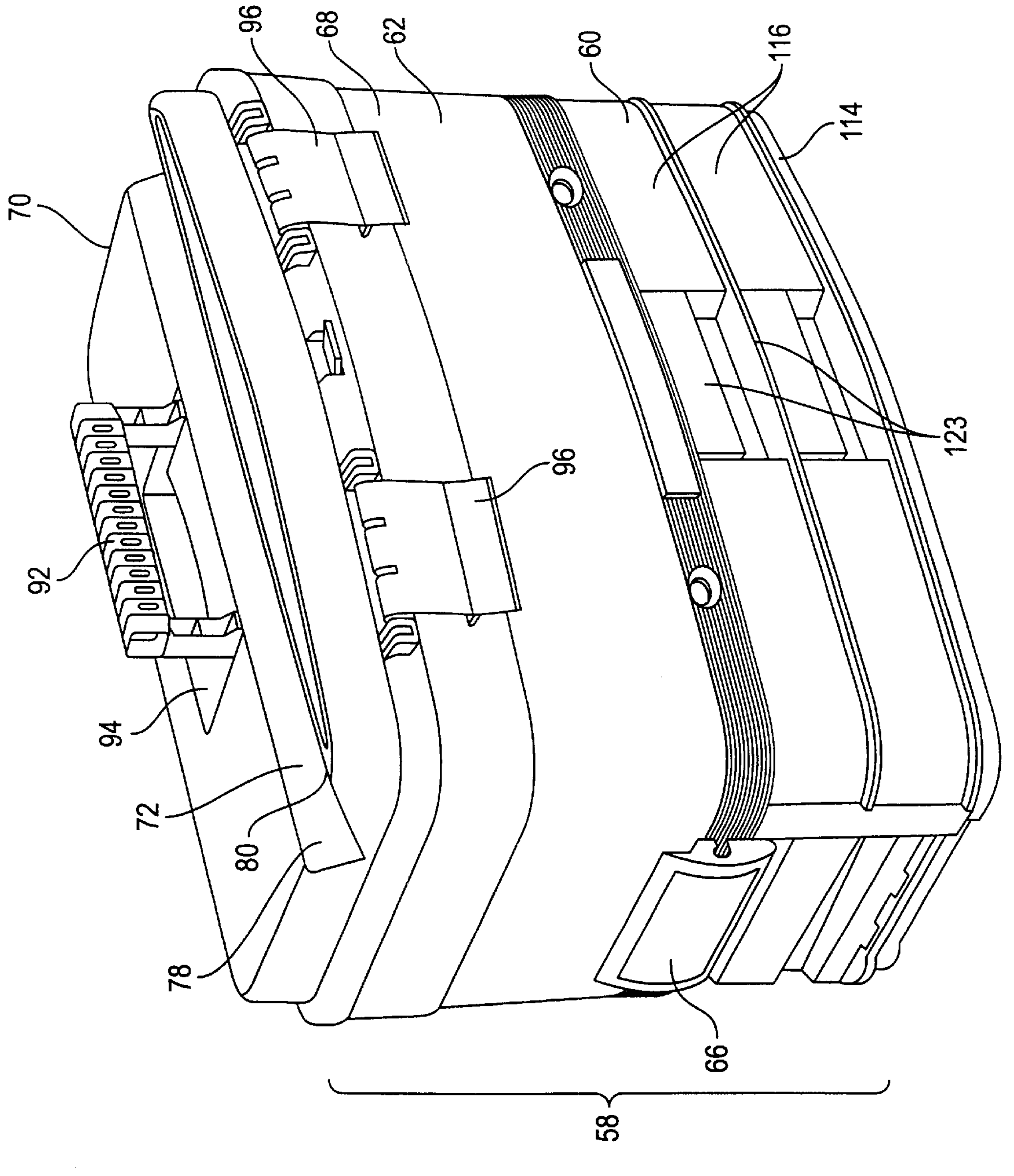
FIGS. 4 and 5 are perspective front views of a toolcase and a drawers assembly of the rolling containers assembly according to the present invention.
Figure 5:
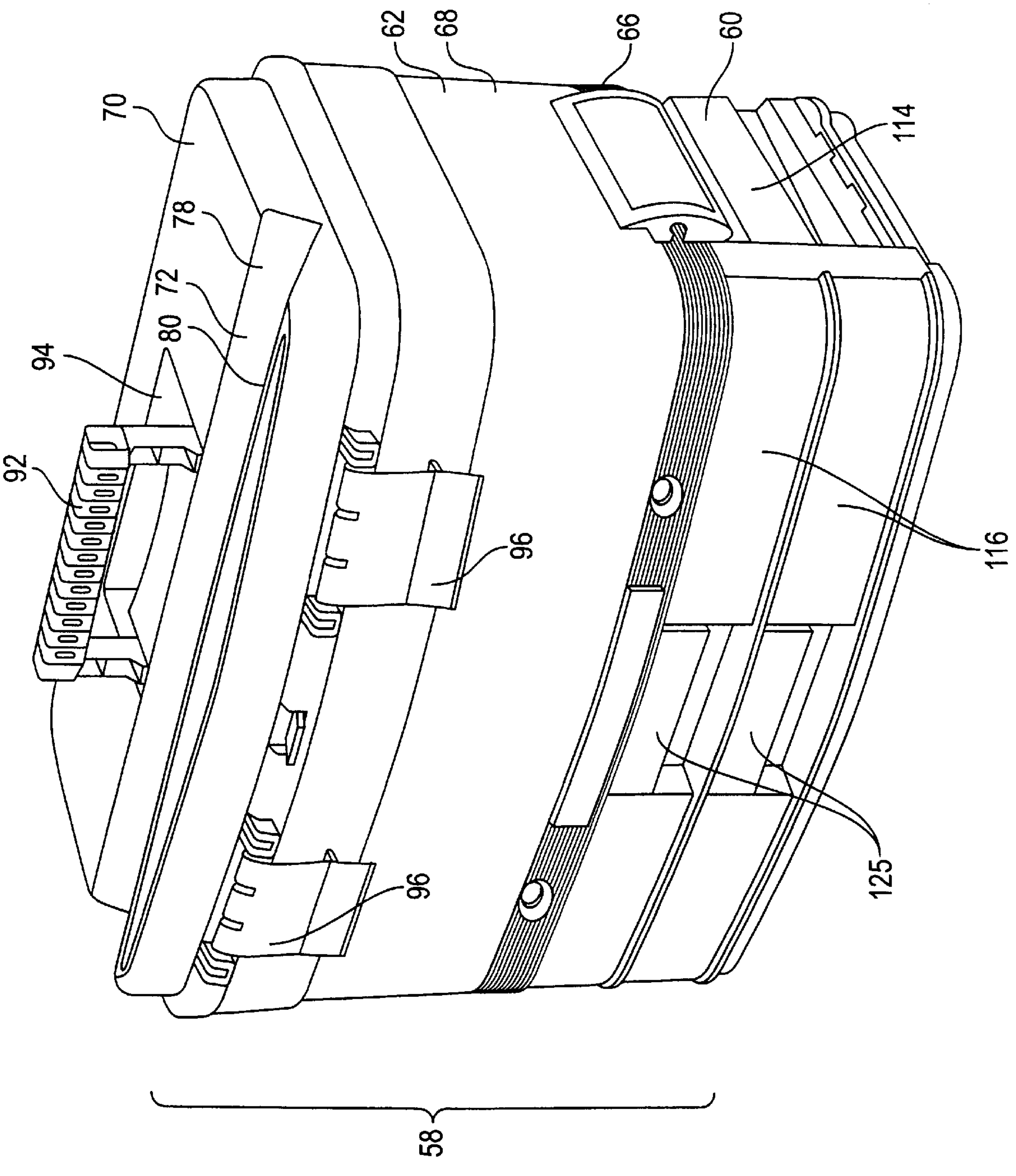

The present invention is of a rolling containers assembly which can be used as a rolling workshop. Specifically, the present invention can be used to assist workers, such as, but not limited to, construction workers, fishermen, repairmen, etc., to carry their working tools in an organized fashion.

The principles and operation of a rolling containers assembly according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIGS. 1–26*b* illustrate some preferred embodiments of a rolling containers assembly according to the present invention, which is referred to hereinbelow interchangeably as rolling containers assembly 50 or assembly 50.

Thus, rolling containers assembly 50 selves for storing working tools and includes a base cabinet 52. At its lower aft end base cabinet 52 is supplemented with a pair of wheels 54. At its aft base cabinet 52 includes a pulling handle 56. Wheels 54 and handle 56 serve for locomoting assembly 50.

Pulling handle 56 is shaped sized and designed to assist a user to pull assembly 50. For example, its upper part is designed to comfortably accept the hand of the user, and is therefore supplemented with four finger accepting recessions 51.

Rolling containers assembly 50 further includes at least one additional cabinet 58. Additional cabinet 58 is removably connectable on top of base cabinet 52.

As further detailed hereinbelow, according to a prefered embodiment of the invention handle 56 is extendible/retractable.

As further detailed hereinbelow, according to another preferred embodiment of the present invention, additional cabinet(s) 58 include, for example, a drawers assembly 60 and/or a toolcase 62.

As further detailed hereinbelow, according to another prefered embodiment of the present invention base cabinet 52 is supplemented with a reel 64.

As best seen in FIG. 12 additional containers 58 are preferably designed modular, such that any combination thereof is deployable over base cabinet 52 or as a standalone configuration. Thus, for example, a plurality of drawer assemblies 62 may be snapped together as an independent drawers tower system with keyholes 63 formed in the rear for wall mounting.

Connecting any of additional cabinet(s) 58 to base cabinet 52 preferably involves snapping. To this end, base cabinet 52 and the additional cabinet(s) 58 are designed snappable to one another, and, to this end, are supplemented with snapping mechanisms 66, which preferably also serve as side claw latches for providing extra stability.

Figure 15B:
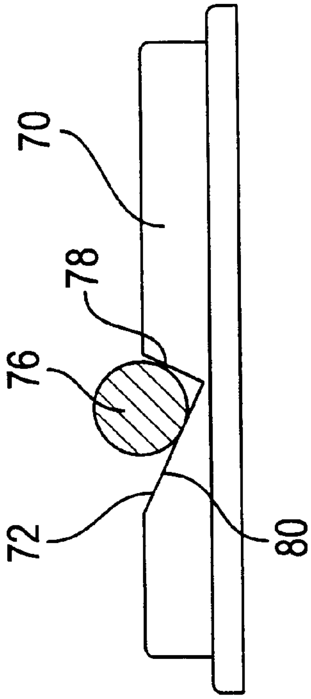
FIGS. 15*a* and 15*b* are cross sections demonstrating the ability of the asymmetric groove according to the present invention to support rectangular and round objects, respectively.
Figure 15A:
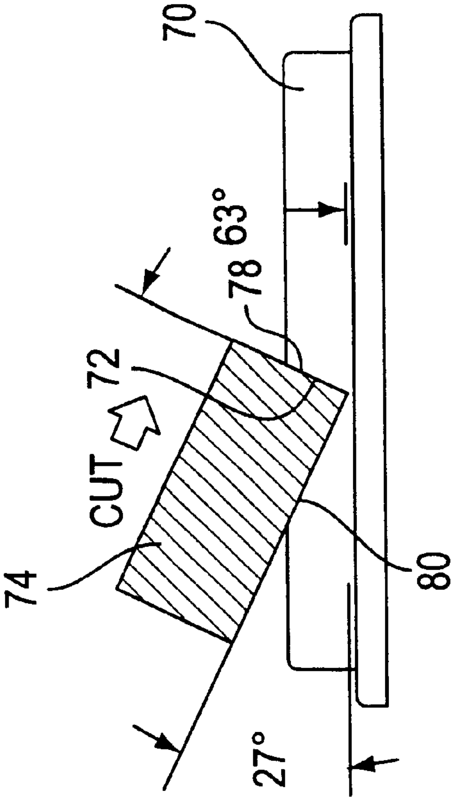

According to a preferred embodiment of the invention toolcase 62 includes a case 68 and an openable cover 70. Cover 70 is preferably fabricated featuring an external groove 72. Groove 72 is usable in supporting rectangular 74 and/or round 76 objects (FIGS. 15*a*–*b*). Groove 72 is preferably asymmetrical in cross section. Preferably, groove 72 is formed as a recess residing between a first wall 78 and a second wall 80 of cover 70. Walls 78 and 80 are deployed in a V shape.

As best seen in FIGS. 15*a*–*b*, first wall 78 is deployed 63±15 degrees with respect to cover 70, second wall 80 is deployed 27±15 degrees with respect to cover 70, whereas first 78 and second 80 walls are deployed 90 degrees with respect to one another.

Figure 14B:
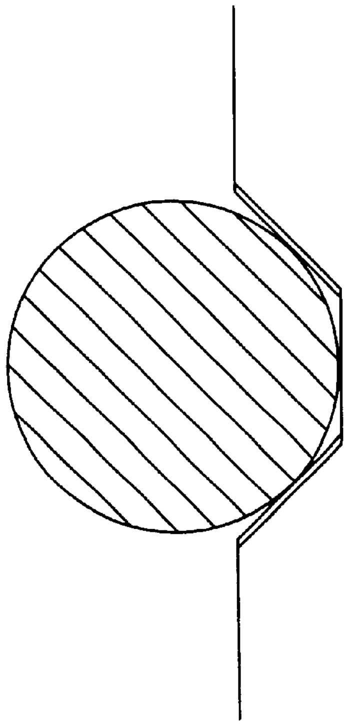
FIG. 14B (PRIOR ART)
FIGS. 14*a* and 14*b* are cross sections of two prior art symmetric grooves formed in toolcase cover.
Figure 14A:
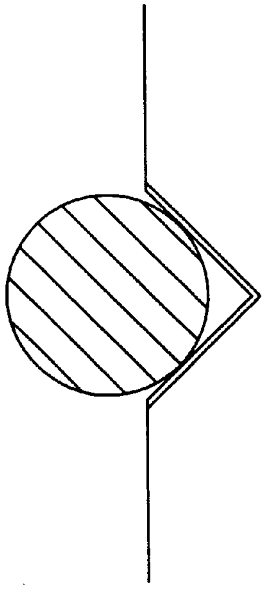
FIG. 14A (PRIOR ART)

Groove 72 is designed to facilitate cutting desired object. Grooves are known in the art for some time and serve to facilitate cutting round objects. However, all prior art grooves, as shown in FIGS. 14*a* and 14*b*, traditionally have symmetric cross sections.

As specifically shown in FIGS. 15*a*–*b*, groove 72, on the other hand, is selected asymmetrical. Groove's 72 architecture is specifically designed to allow cutting both rectangular wood and round pipe elements. To this end, the asymmetry of about 63/27 degrees is preferably selected. This asymmetry dictates that groove's 72 shortest side is more than half shorter than groove's 72 longest side, allowing a 2"×4" wood size to be cut in a stable manner without excess slippage.

The 63/27 degrees feature has been experimentally shown to be the most useful angle for this sort of work, however, it is feasible that for other applications other asymmetric dimensions would prove more adapted. Therefore, according to the present invention groove 72 may have any asymmetrical or symmetrical design.

Figure 16:
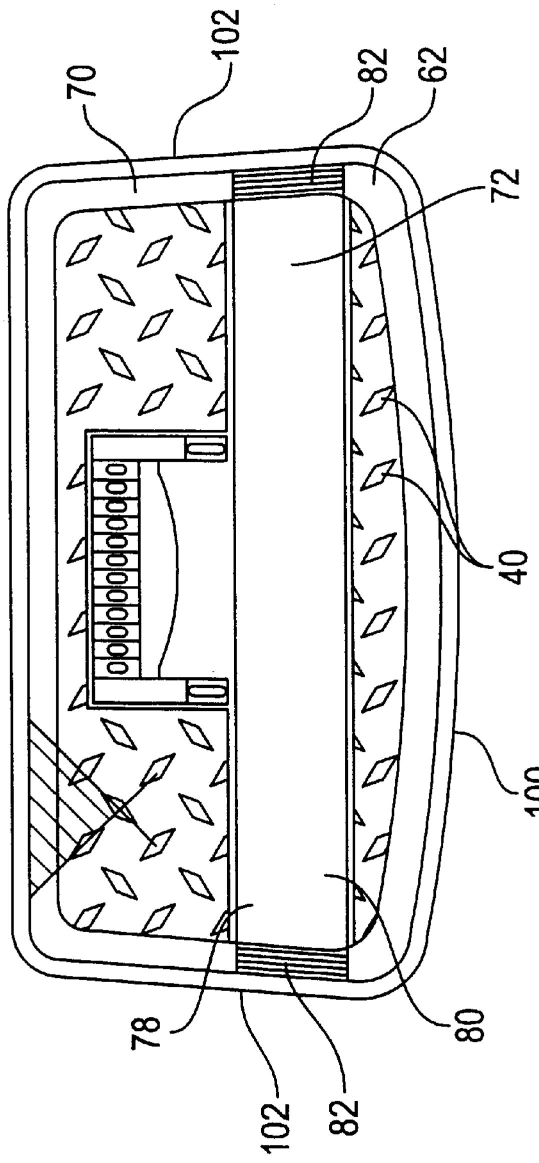
FIG. 16 is a top view of the cover of the toolcase of the rolling containers assembly according to the present invention.

As best seen in FIG. 16, groove 72 is preferably formed with grip ribs 82 on at least a section thereof Grip ribs 82 are preferably arranged on the outer edges of groove 72. Grip ribs 82 are designed to provide friction and thereby to minimize the vibration of the material being cut, which tends to vibrate in concert with the saw.

Figure 17A:
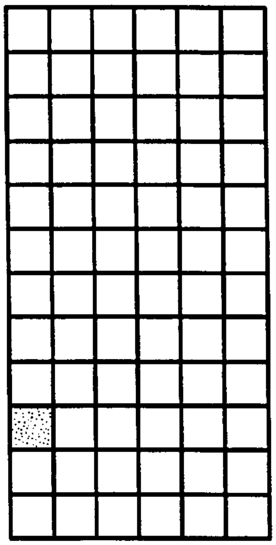
FIG. 17A (PRIOR ART)
FIGS. 17*a* and 17*b* are comparative schematic depictions of a prior art rib arrangement and a rib arrangement used to strengthen the cover of the toolcase according to the present invention, respectively.
Figure 17B:
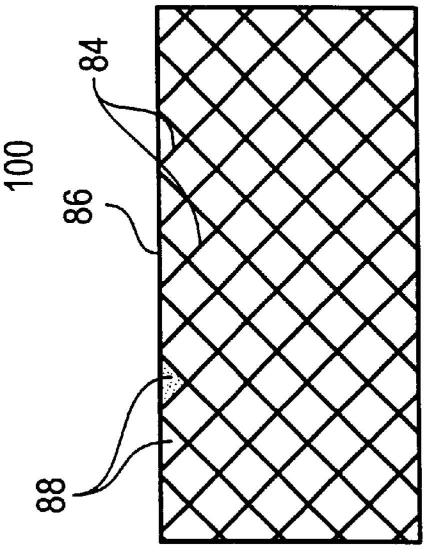

As best seen in FIGS. 16 and 17*a*–*b*, cover 70 is preferably formed with underlying strengthening ribs 84. Underlying strengthening ribs 84 are preferably deployed crosswise with respect to one another and obliquely with respect to an edge 86 of cover 70, such that triangular shapes 88 are formed along edge 86.

Preferably underlying strengthening ribs are deployed 90 degrees crosswise with respect to one another and 45 degrees with respect to edge 86 of cover 70.

As best seen in FIG. 16, according to a preferred embodiment of the present invention cover 70 is formed with external protrusions 90. Protrusions 90 are deployed above, parallel to, underlying strengthening ribs 84 and serve for at least partially disguising sink marks associated with ribs 84. External protrusions 84 are preferably acquired a diamond shape (♦).

It has been recent practice to heavily rib the underside of plastic toolcase covers to withstand the weight of the average person, who typically will use them as defacto step tools. The "sink marks" that show on the top surface of such covers is noticeable and disguised typically with some sort of decoration running in the same direction of the ribbing.

FIG. 16 shows a section of ribs 84 arrangement on the top left end of cover 70. This ribbing preferably runs the entire underside of cover 70. As already mentioned hereinabove ribbing 84 is preferably deployed at 45 degrees orientation with respect to the edge of the cover. Thereby ribs 84 terminate in triangles 88 (FIG. 17*b*). The triangular termination around the relatively more sensitive perimeter of the cover is measurably stronger than traditional rectangular ribbing (FIG. 17*a*).

The preferred embodiment is aesthetically enabled by the chosen diamond pattern that overlays the ribs on the top side of the case (FIG. 16). Although such diamond patterns are a common anti-slippage icon in the hardware steel industry, this is the first time to have them introduced into the plastic industry to serve as anti-slippage elements and at the same time for disguising rib sinkage marks.

According to another prefered embodiment of the present invention cover 70 includes a carrying handle 92. Carrying handle 92 is preferably foldable into a recession 94 formed in cover 70 which is sized and dimensioned for receiving handle 92 when folded.

According to another preferred embodiment of the present invention toolcase 62 includes at least one latch 96 (two are shown) for securing/locking cover 70 to case 68 when closed. Cover 70 is hingedly connected to case 68 via a hinge 98. Preferably, as best seen in FIG. 16, toolcase 62 includes a front 100, sides 102 and back 104, wherein sides 102 taper toward back 104. Front 100 is preferably curved.

Figure 18A:
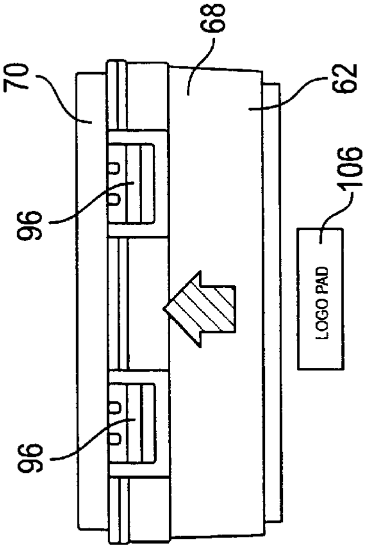
FIGS. 18*a* and 18*b* are front views of the toolcase of the rolling containers assembly according to the present invention demonstrating the addition of a Logo pad.
Figure 18B:
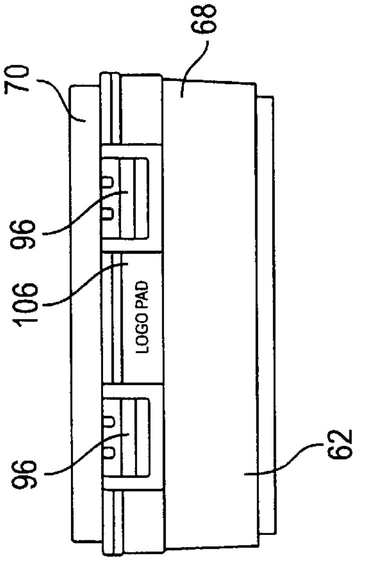

As shown in FIGS. 18*a–b*, according to a preferred embodiment of the present invention a Logo plate 106 is added between latches 96. Plate 106 is preferably a separate molded panel which is molded at 90 degrees to the rest of the case, however it appears to be an integral part of the case when assembled, rather than a separate item.

According to another preferred embodiment of the present invention, and as specifically shown in FIGS. 19–22, toolcase 62 preferably includes a removable tray 108, deployable within case 68. Tray 108 preferably includes a tray-handle 110. Preferably, as best seen in FIG. 19*b*, tray-handle 108 nests between side arms 110 of carrying handle 92 of cover 70.

Figure 19A:
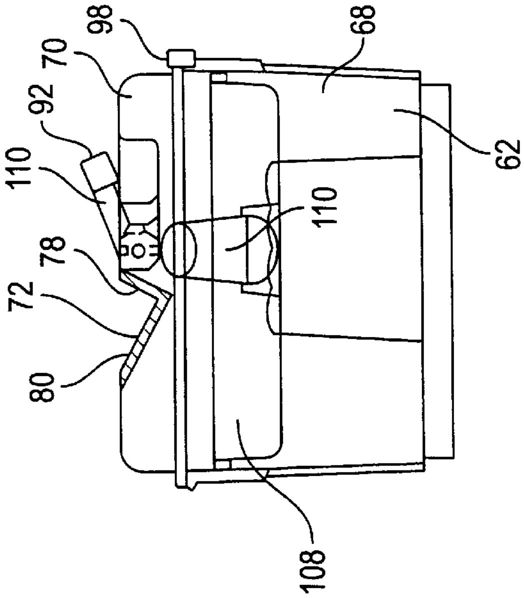
FIG. 19A (PRIOR ART)
FIGS. 19*a* and 19*b* are side views of a prior art tray arrangement and a tray arrangement of the toolcase according to the present invention, respectively.
Figure 19B:
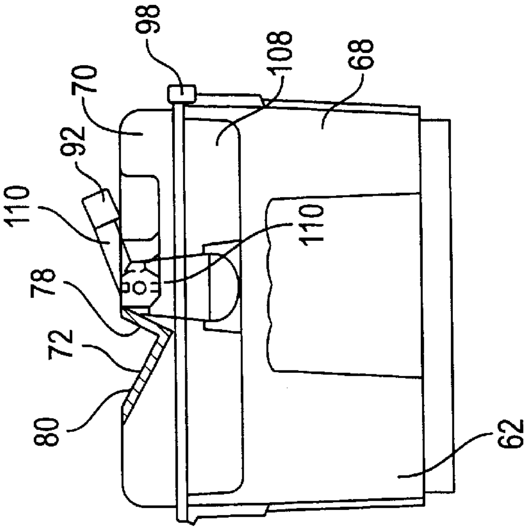

Thus, in sharp contrast with the conventional configuration shown in FIG. 19*a*, wherein the tray handle 110' resides below the cover handle, thereby effectively lowering the tray in the case, according to the present invention, the tray handle nests between the vertical arms of the cover handle, rendering the tray about 20% higher, gaining much requested additional room in the main case.

Furthermore, with the handle residing directly underneath the cover, it now acts as a load bearing member when a user stands on the case, transmitting a partial load through the tray onto the perimeter of the base. One additional benefit is that ribs which are preferably deployed on the underside of the tray can be lighter and use less material.

A common problem with plastic tray handle designs is how to produce a solid feeling handle from both sides. Typically the handle is open from the top (FIG. 21*a*), which functions well but is not attractive, or the handle is open from the bottom (FIG. 21*b*) which looks good but can be painful to the hand.

Figure 22C:
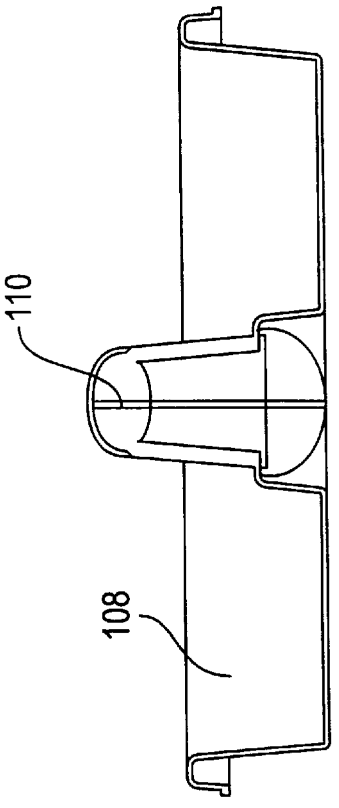
FIGS. 22*a*, 22*b* and 22*c* are top and side views of the tray handle and side view of the tray of the toolcase of the rolling containers assembly according to the present invention.
Figure 22A:
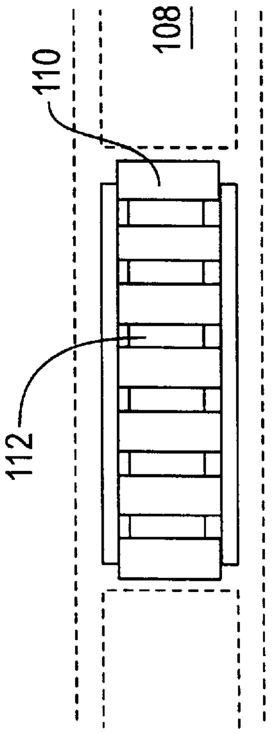
Figure 22B:
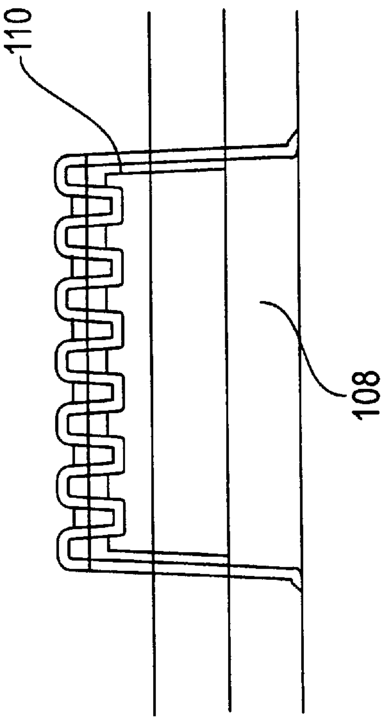

According to the present invention, as specifically shown in FIGS. 21*c* and 22*a*, an additional piece 112 is used to fill the area of a handle open from the top by snapping piece 112 into the top opening. Thereby, both functionality and aesthetic are achieved. This solution offers both solid feeling and looks to the handle and a good surface area for hand comfort.

Figure 23:
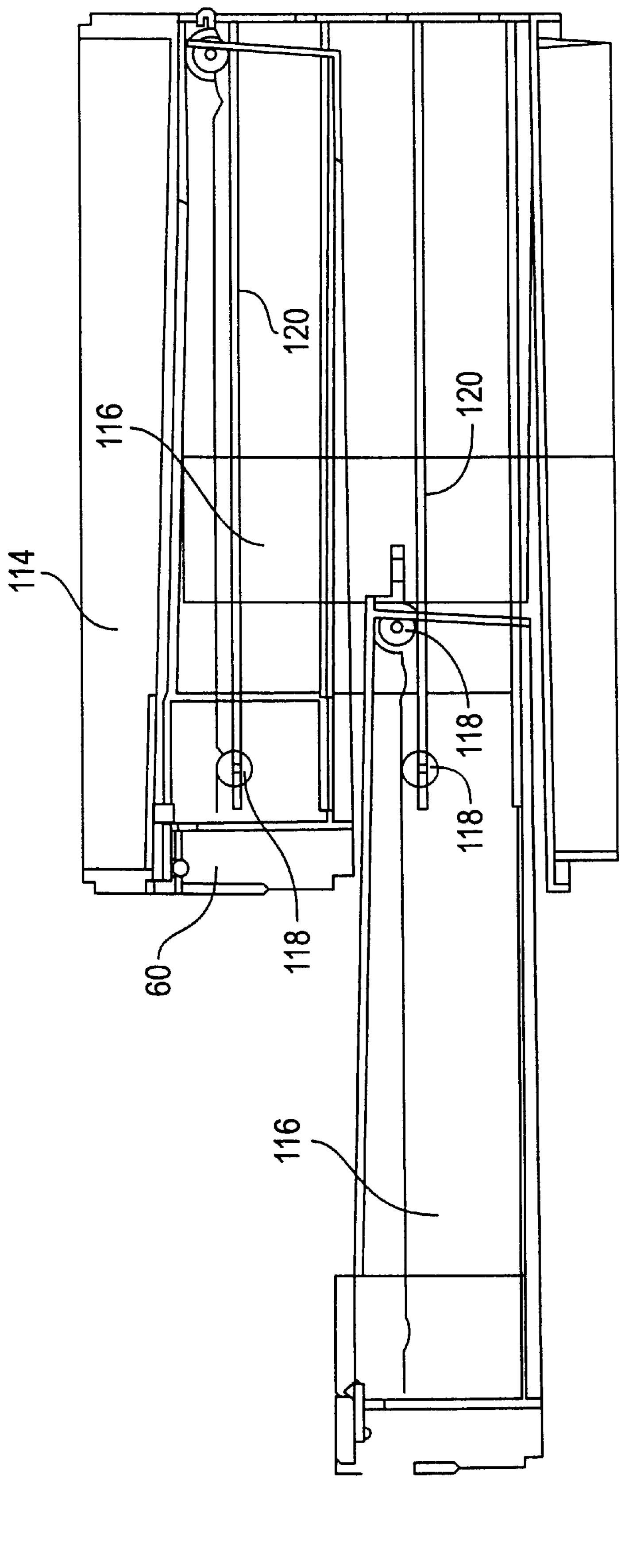
FIG. 23 is a side view of the drawers assembly of the rolling containers assembly according to the present invention.
Figure 24:
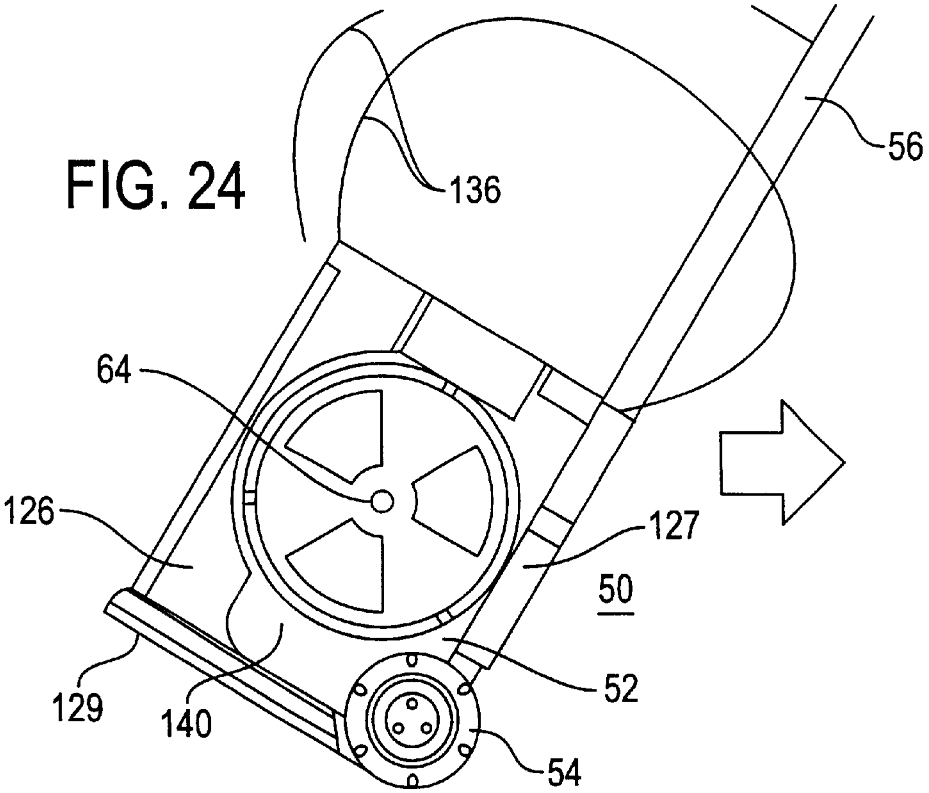
FIG. 24 is a side view of the base cabinet of the rolling containers assembly according to the present invention, demonstrating options to attach strings onto the base cabinet.

According to a preferred embodiment of the invention drawers assembly 60 includes a casing 114 and at least one translating drawer 116 (two are shown) translatably engaged by casing 114. Preferably, as shown in FIG. 23, drawer(s) 116, aided by reels 118, translate over rails 120 which are connected to, or integrally formed with, casing 114.

Figure 6:
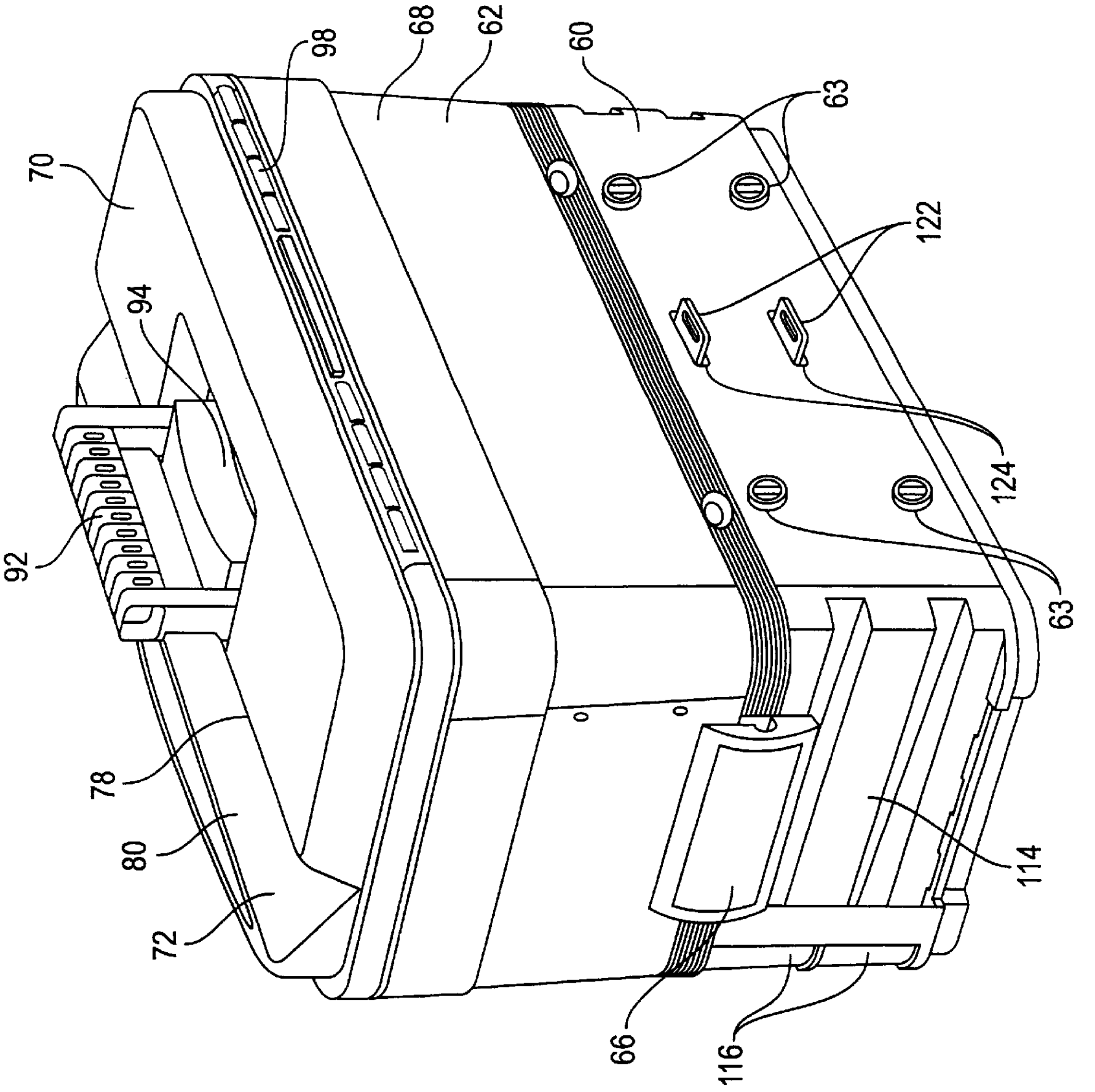
FIG. 6 is a perspective rear view of the toolcase and drawers assembly of FIGS. 4 and 5.

According to a preferred embodiment of the present invention, all of drawers 116 are securable close via a single securing member 121 (best seen in FIG. 7), which engages securing elements 122 attached to a the aft of drawers 116 and protrudes through dedicated holes 124 formed in casing 114 (FIG. 6).

Preferably, single securing member 121 is attached to or forms a part of handle 56, such that when handle 56 is retracted securing member 121 simultaneously secures all of drawers 116 closed.

It is common for toolbox drawers to have locks on their front side. Due to handle 56 of assembly 50 it is possible to have the drawers secured/locked from behind.

In any case, drawers 116 are preferably supplemented with opening handles 123. Handles 123 are preferably also designed to secure/lock drawers 116 to casing 114 when closed.

A common problem associated with cabinets and drawers of any construction is that the drawers have to remain to a significant percentage within the casing of the product even in the extended position to avoid falling out. The drawers assembly described herein is notable for having cabinet rollers appended beyond the extremity of the product. This feature allows the drawers to be pulled out further than would otherwise be possible.

According to a preferred embodiment of the present invention base cabinet 52 of rolling containers assembly 50 includes a casing 126 to which handle 56 and wheels 54 are engaged. Base cabinet 52 further includes a flipping bin 128. Casing 126 is formed with a housing 127 for holding handle 56 when extended and for accepting handle 56 when retracted. Thus, handle 56 is retractable into, and extendible from, housing 127.

Casing 126 is formed having a base element 129. Base 129 is designed to be in contact with the floor when assembly 50 is positioned in its upright position. Wheels 54 are designed to have substantially no or minimal contact with the floor when in the upright position. Wheels 54 take firm contact with the floor only when assembly 50 is in its locomoting position, as shown, for example, in FIG. 24.

Flipping bin 128 is rotatable with respect to casing 126 and has an upper opening 130. Casing 126 is preferably formed with an upper rim 132. Rim 132 is supplemented with anchor holes 134 which serve for attaching strings 136 (shown in FIG. 24) for effecting carriage of desired items on top of base cabinet 52 when additional cabinet(s) 58 are removed.

Handle 52 is preferably formed with additional holes 138 which further serve for attaching strings 136 for effecting the carriage of bigger items on top of base cabinet 52.

Thus, the anchor holes situated fore and aft at the top of the base cabinet allow the base cabinet and the handle to be used as a separate dolly. This is particularly useful when additional materials have to be carried to the working site.

According to a preferred embodiment of the present invention reel 64 is a revolving electrical reel rotatably attached to casing 126, within a dedicated recession 140 formed therein, such that reel 64 would not protrude from the general outline of base cabinet 52.

According to a preferred embodiment of the present invention reel 64 is removable (disconnectable/detachable) from casing 126, and may function as a standalone reel.

Figure 25:
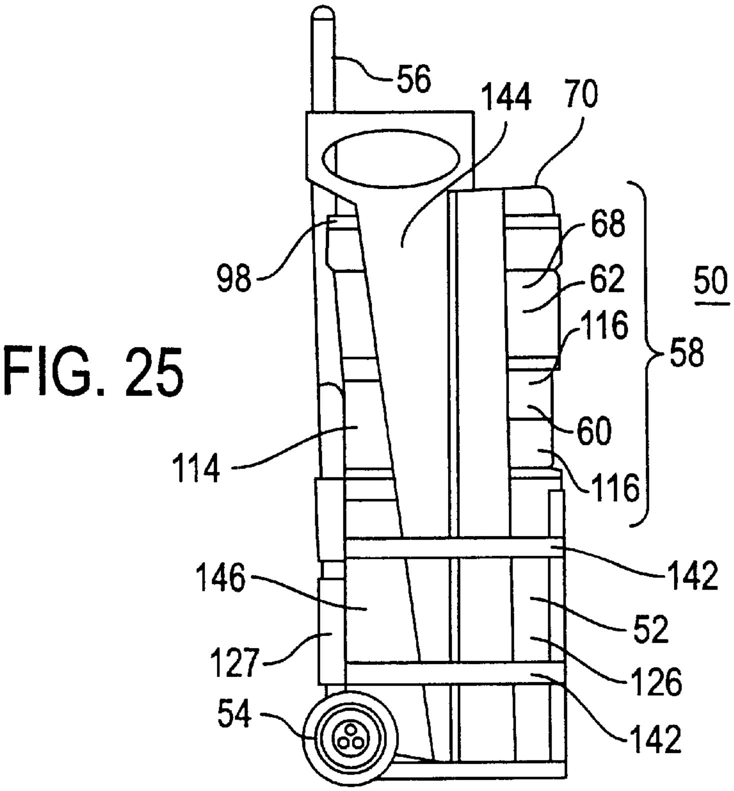
FIG. 25 is a side view of the rolling containers assembly according to the present invention, demonstrating the attachment of a working tool thereon via bands.

As specifically shown in FIG. 25, according to a preferred embodiment of the present invention casing 126 is supplemented with at least two elastic bands 142, designed for engaging desired long items 144 (e.g., a saw) along a side 146 thereof.

Figure 7:
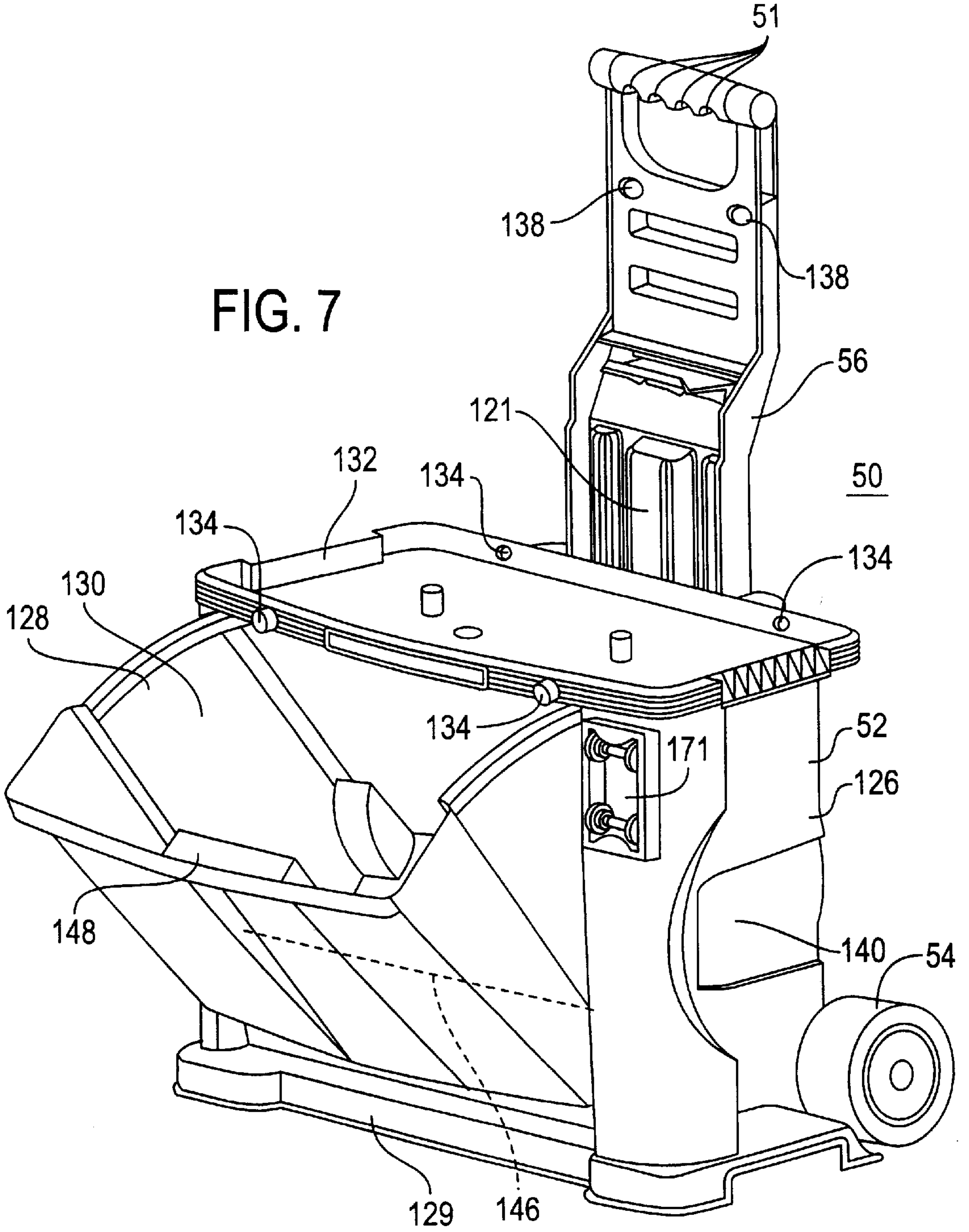
FIG. 7 is a perspective front view of a base cabinet of the rolling containers assembly according to the present invention.
Figure 8:
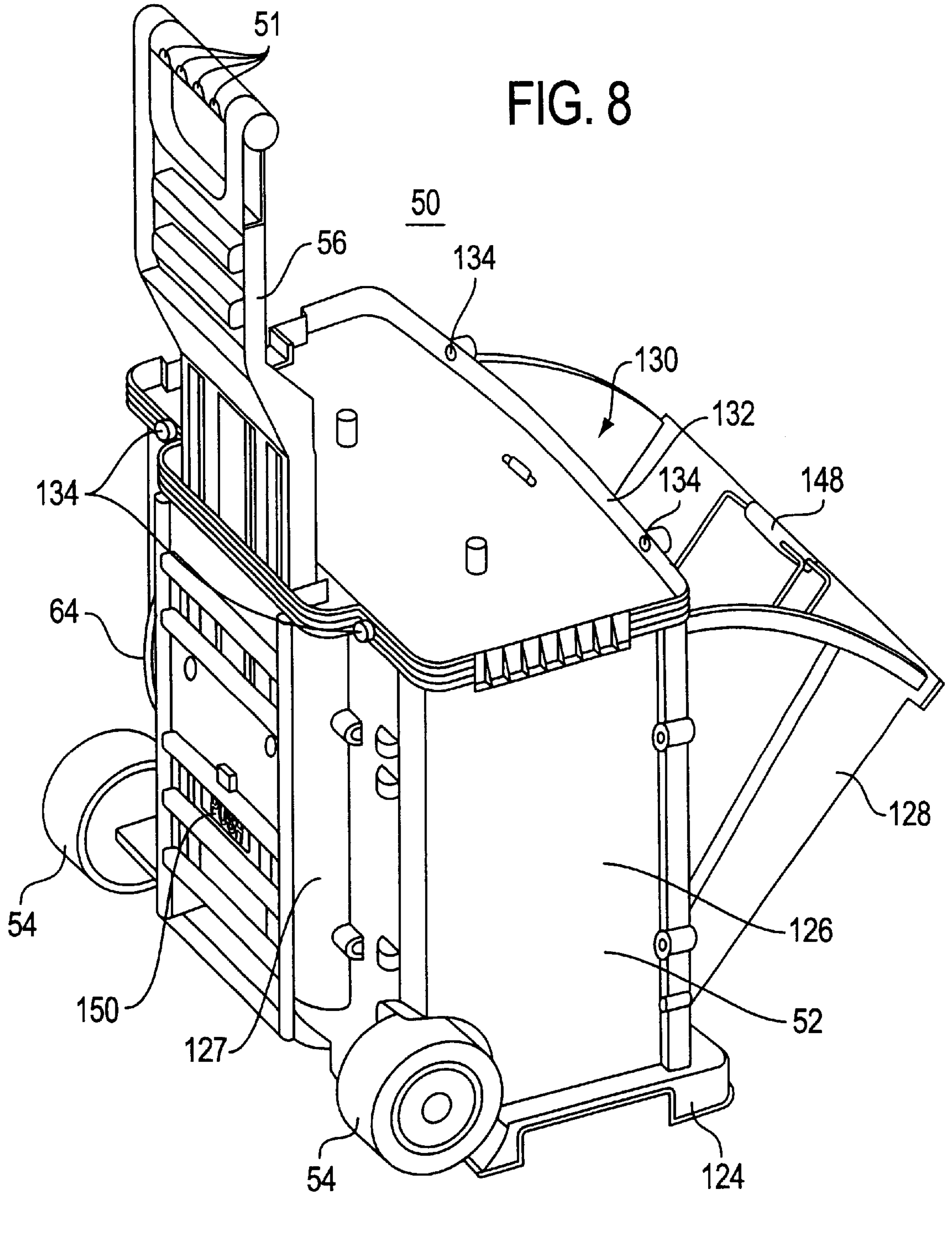
FIG. 8 is a perspective rear view of the base cabinet of FIG. 7.
Figure 9:
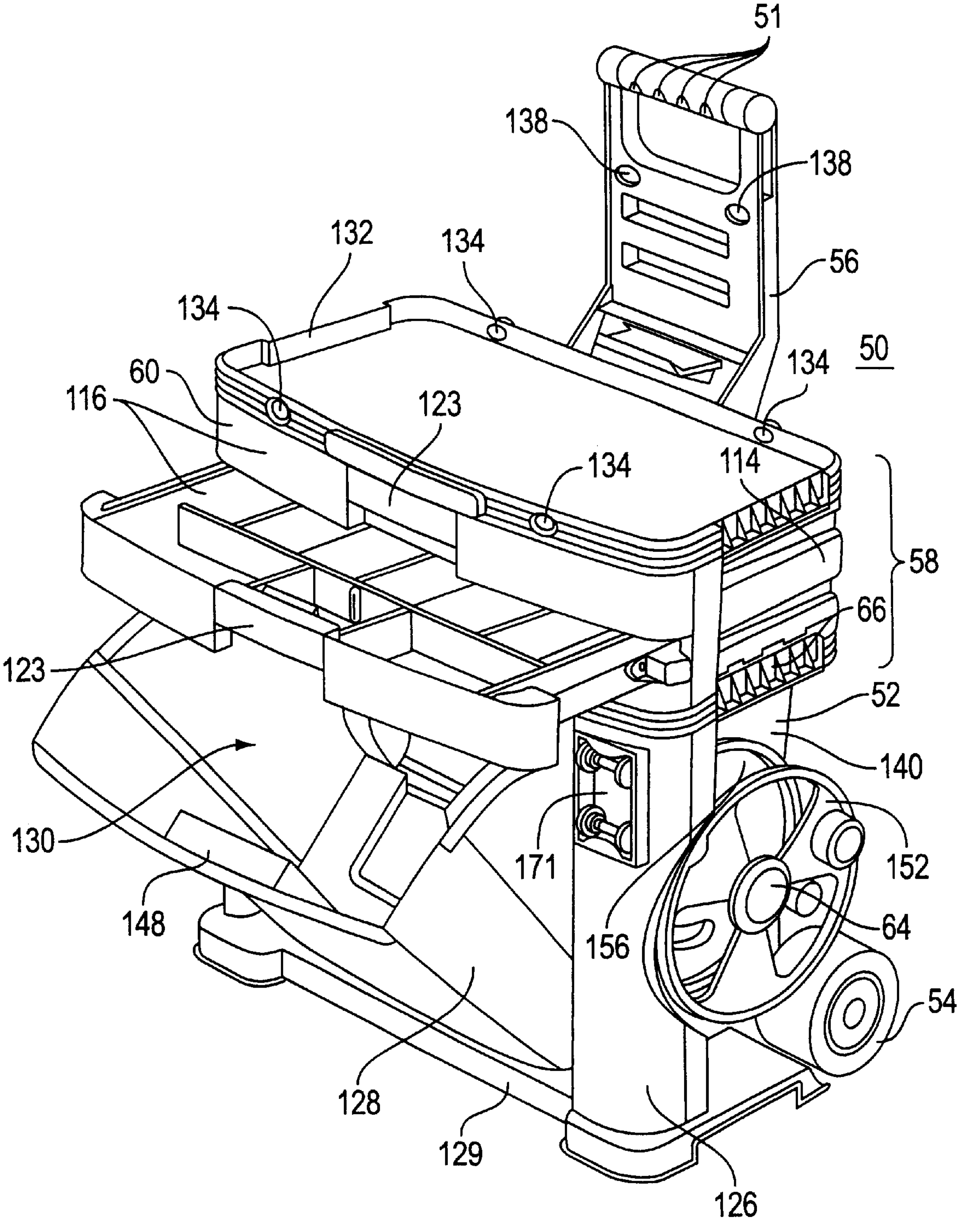
FIG. 9 is a perspective front view of the base cabinet and the drawers assembly of the rolling containers assembly according to the present invention.

According to another preferred embodiment of the present invention flipping bin 128 is rotatably connected to casing 126 via a hinge, marked by a broken line 146 in FIG. 7, located such that bin 128 opens when reaches beyond a center of gravity point and closes when is before the center of gravity point, such that bin 128 fully opens or closes when used. This feature of bin 128 is effective also when load is loaded therein. Therefore, when used, bin 128 remains open irrespective of its content load. Conversely bin 128 remains closed even when not locked in the transportable situation of assembly 50, shown, for example in FIG. 24.

However, according to a preferred embodiment of the invention bin 128 is equipped with a front lock 148, which locks bin 128 to casing 126.

Handle 56 is deployed on the back side of base cabinet 52 and is selected conventional in its design, as seen, for example, in rolling luggage pieces, e.g., by SAMSONITE. However, such handles have so far not been employed as described herein.

According to a preferred embodiment of the present invention, handle 56 is completely detachable from assembly 50 to allow for separation of the components thereof for storage or transportation in confined spaces i.e., closets or car trunks.

Handle 56 is attached/detached from base cabinet 52 via a flexing member 150. Flexing members are well known in the art of plastics and require no further description herein.

Reel 64 is functionally notable for the following features. First, as already mentioned hereinabove, it is removable from casing 126 and may serve as a separate standalone reel, functioning independently of assembly 50. Reel 64 is locked onto its location (recession 140) on casing 126 by a quarter turn locking mechanism as further detailed hereinbelow.

Current reels for electric cables or other purposes (e.g., garden/pool hoses) share a common construction i.e., a reel comprised of a hollow core and round flanges rotating about an axle. Such reels are typically appended with legs arrangement or a handle to improve functionality.

Reel 64 according to the present invention appears traditional by intent, but its functionality is quite different form the current art.

Figure 10:
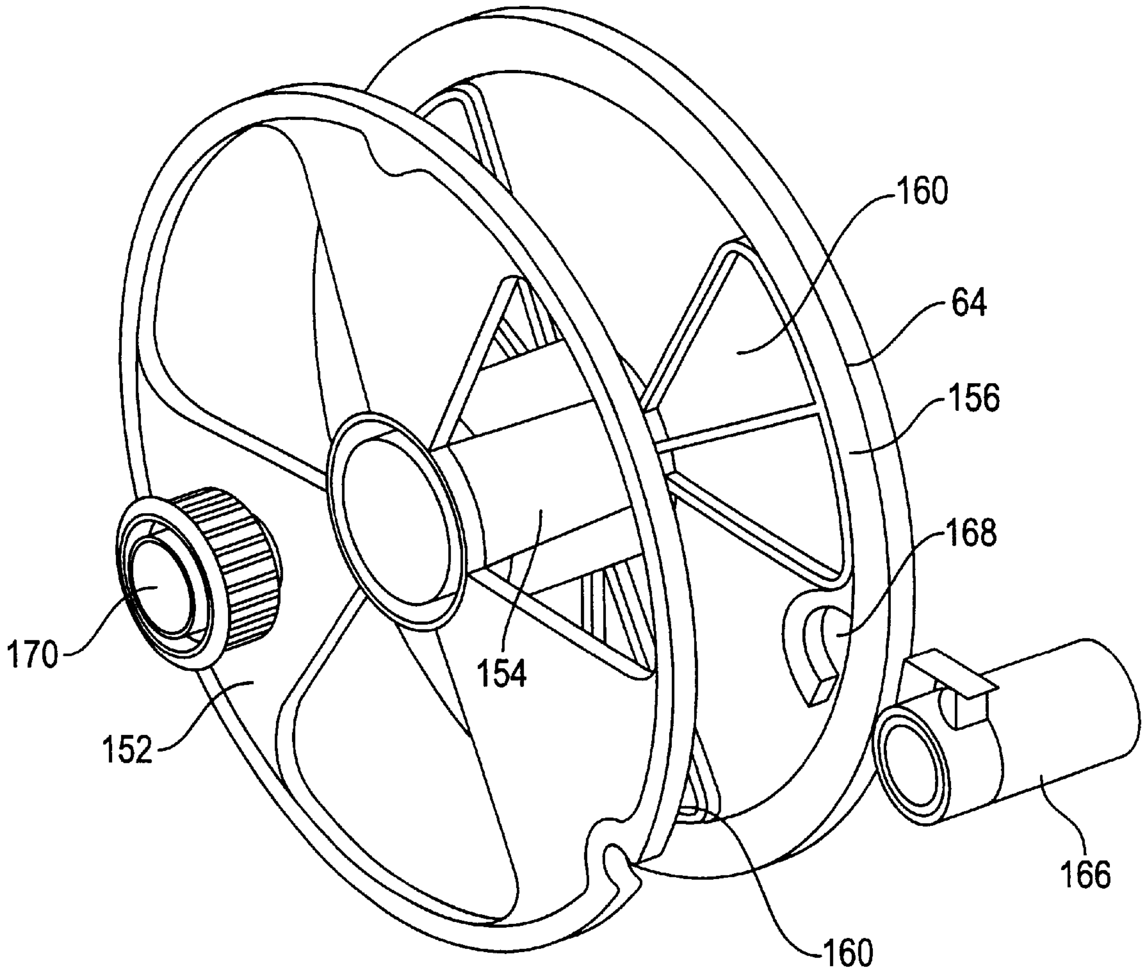
FIG. 10 is a perspective view of a reel of the rolling containers assembly according to the present invention.
Figure 11:
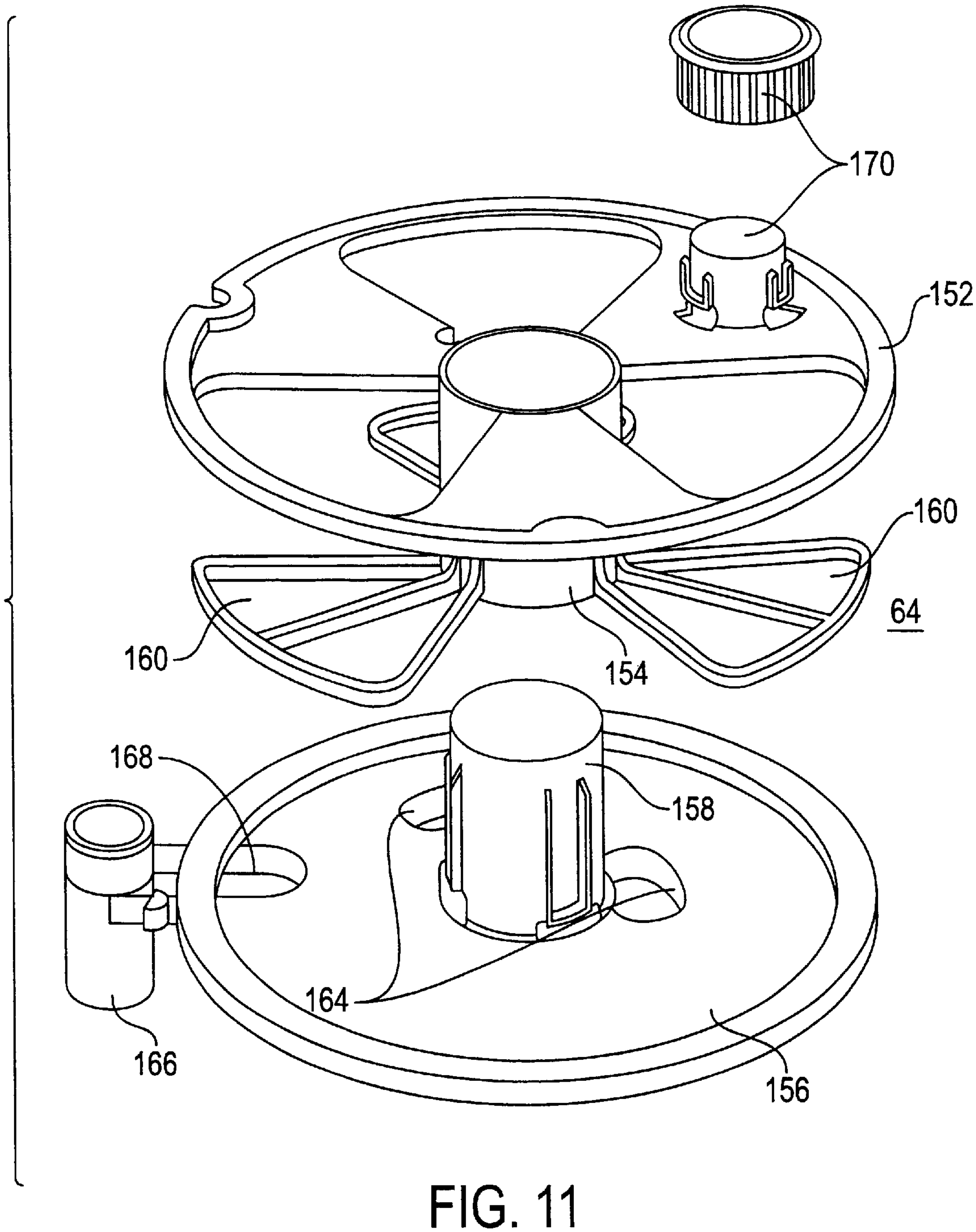
FIG. 11 is an exploded perspective view of the reel of FIG. 10.
Figure 12C:
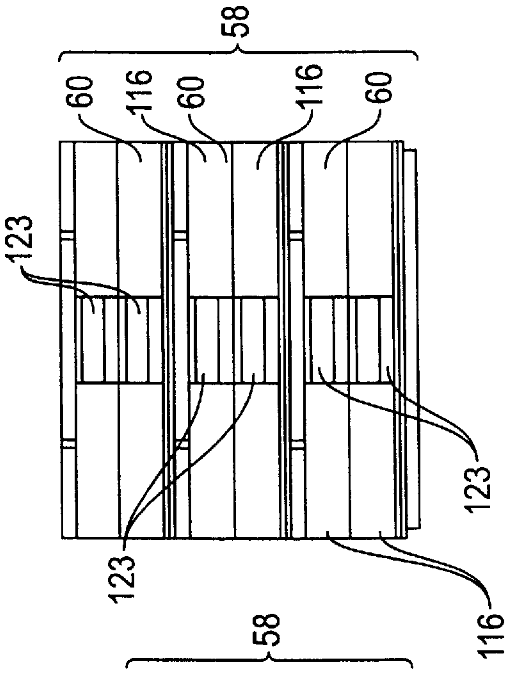
FIG. 12 is a front view of the rolling containers assembly according to the present invention demonstrating its modularity.
Figure 12B:
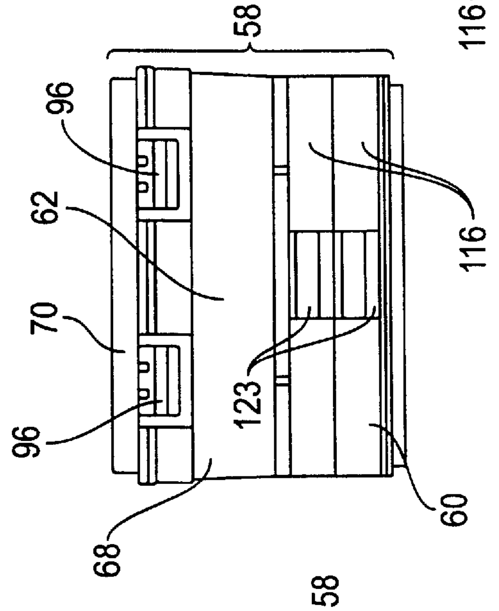
Figure 12A:
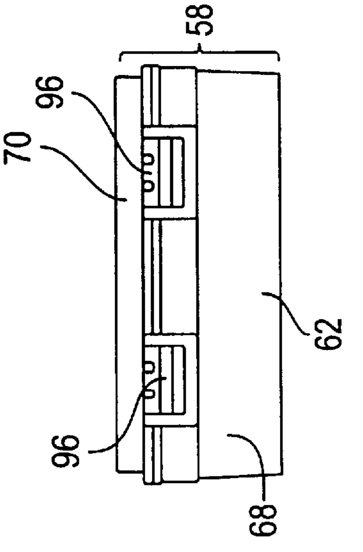
Figure 12F:
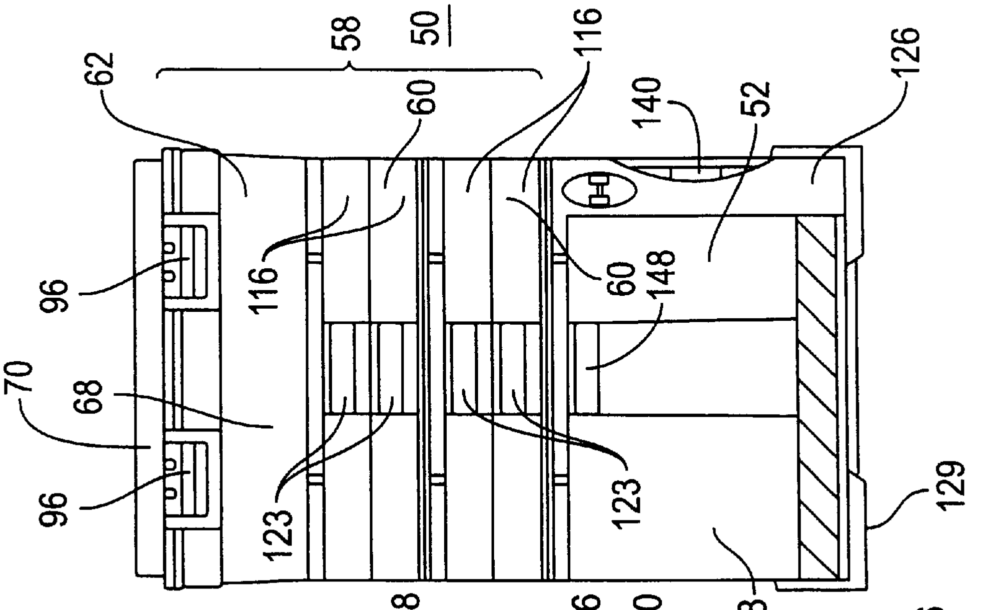
Figure 12E:
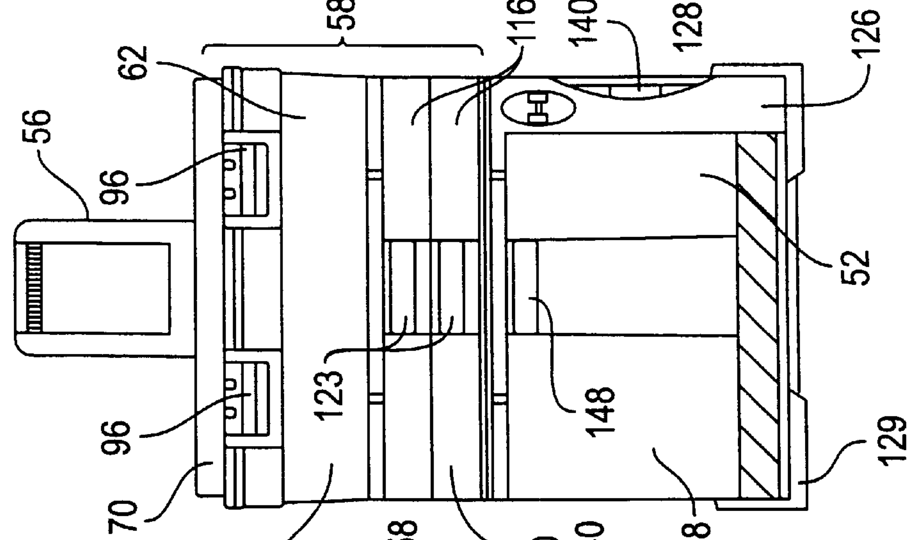
Figure 12D:
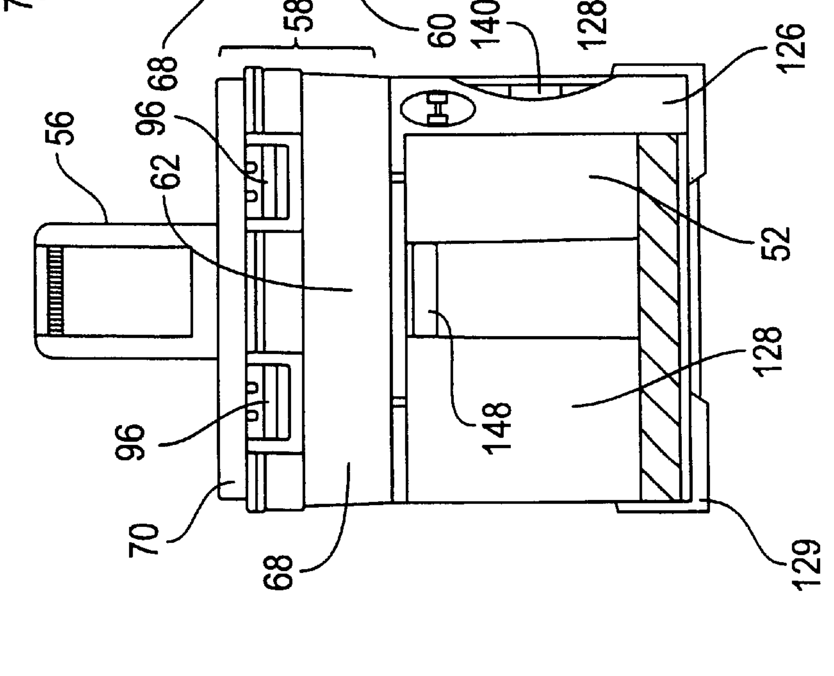
Figure 13B:
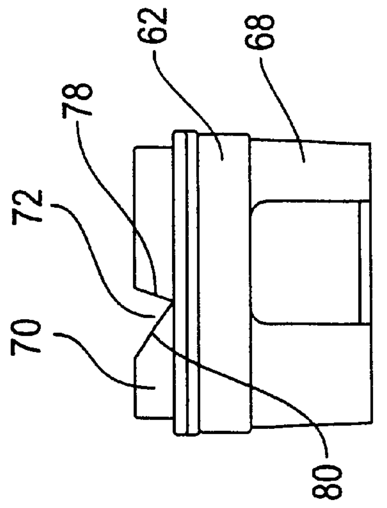
FIGS. 13*a* and 13*b* are front and side views of the toolcase of the rolling container assembly according to the present invention, demonstrating an asymmetric groove formed in its cover.
Figure 13A:
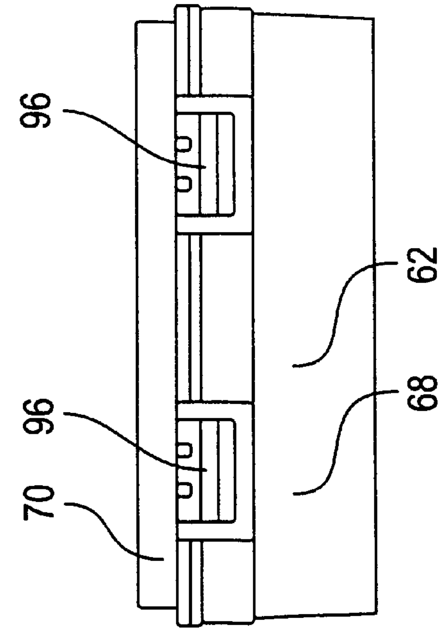

As best seen in FIGS. 10 and 11 reel 64 includes a front round flange 152 which is affixed to a core 154 which revolves. Reel 64 further includes a back flange 156 which is affixed to yet another core 158 which does not revolve. Core 154 rotatably fits inside core 158. Core 158 therefore acts as an axle for core 154 and flange 152 to revolve on. Functionality of such an arrangement would be significantly impaired without a revolving back flange to carry the weight of the cord and prevent friction. To this end, front flange 152 and core 154 carry several (e.g., three or more) paddles 160 deployed at the rear end of core 154.

When assembled paddles 160 lay against static back flange 156, rotating thereon. Paddles 160 effectively carry the weight of the cord preventing spread and allowing the otherwise revolving rear flange to act as a static mounting point.

Figure 26A:
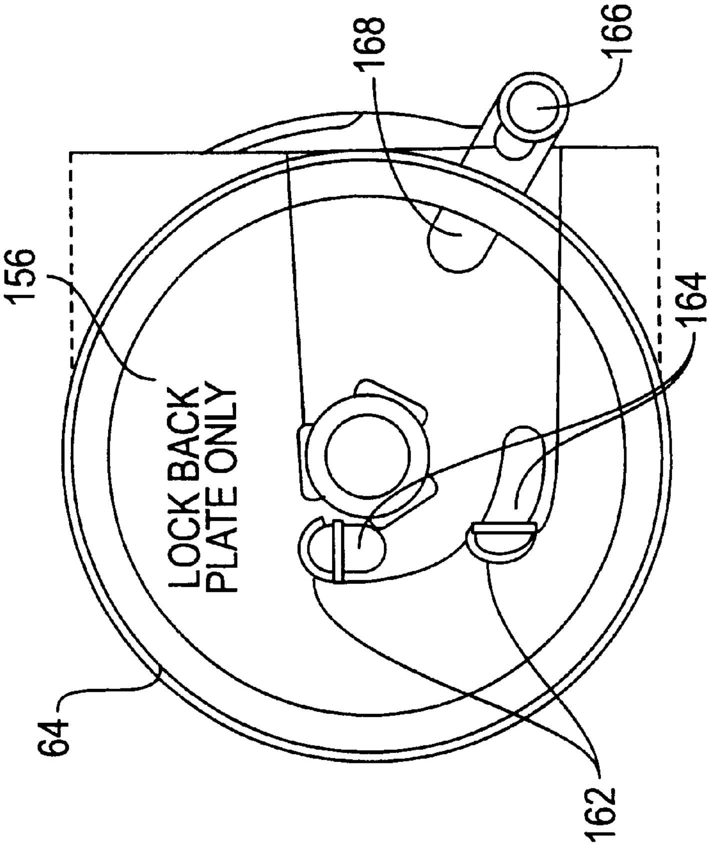
FIGS. 26*a* and 26*b* are side views of a backplate of the reel of the rolling containers assembly according to the present invention in locked and unlocked positions.
Figure 26B:
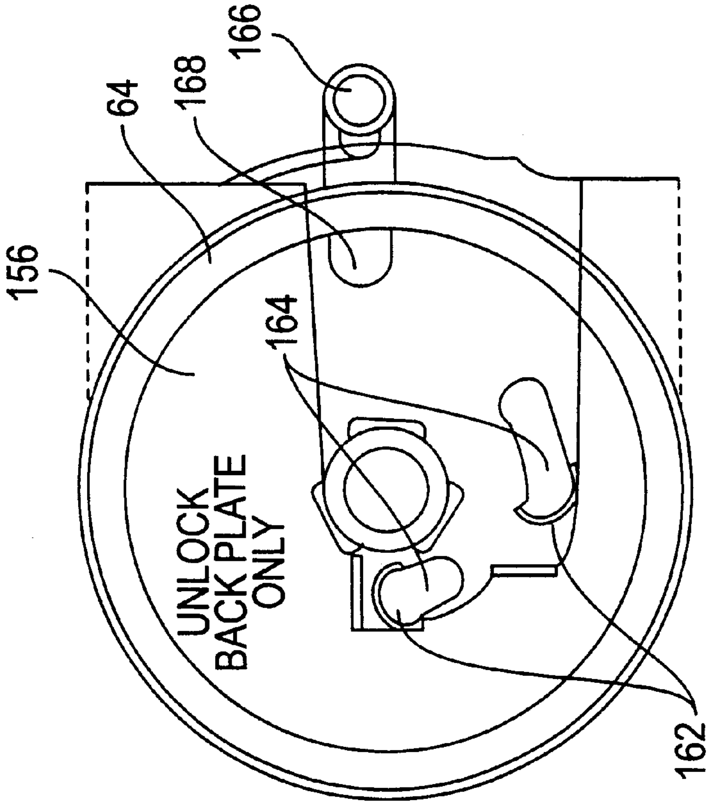
Figure 27:
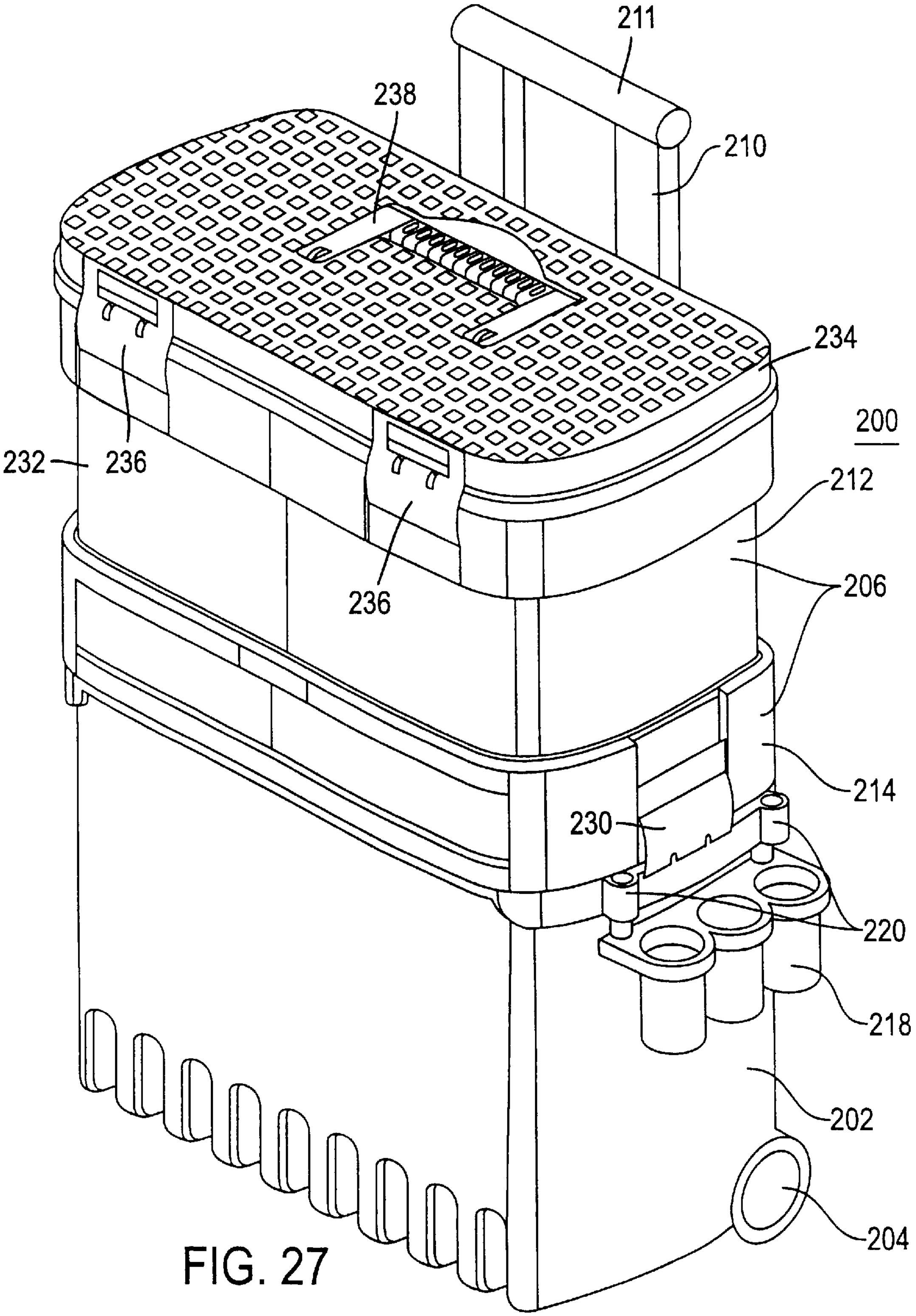
FIGS. 27, 28 and 29 are perspective views of another embodiment of the rolling containers assembly according to the present invention.
Figure 28:
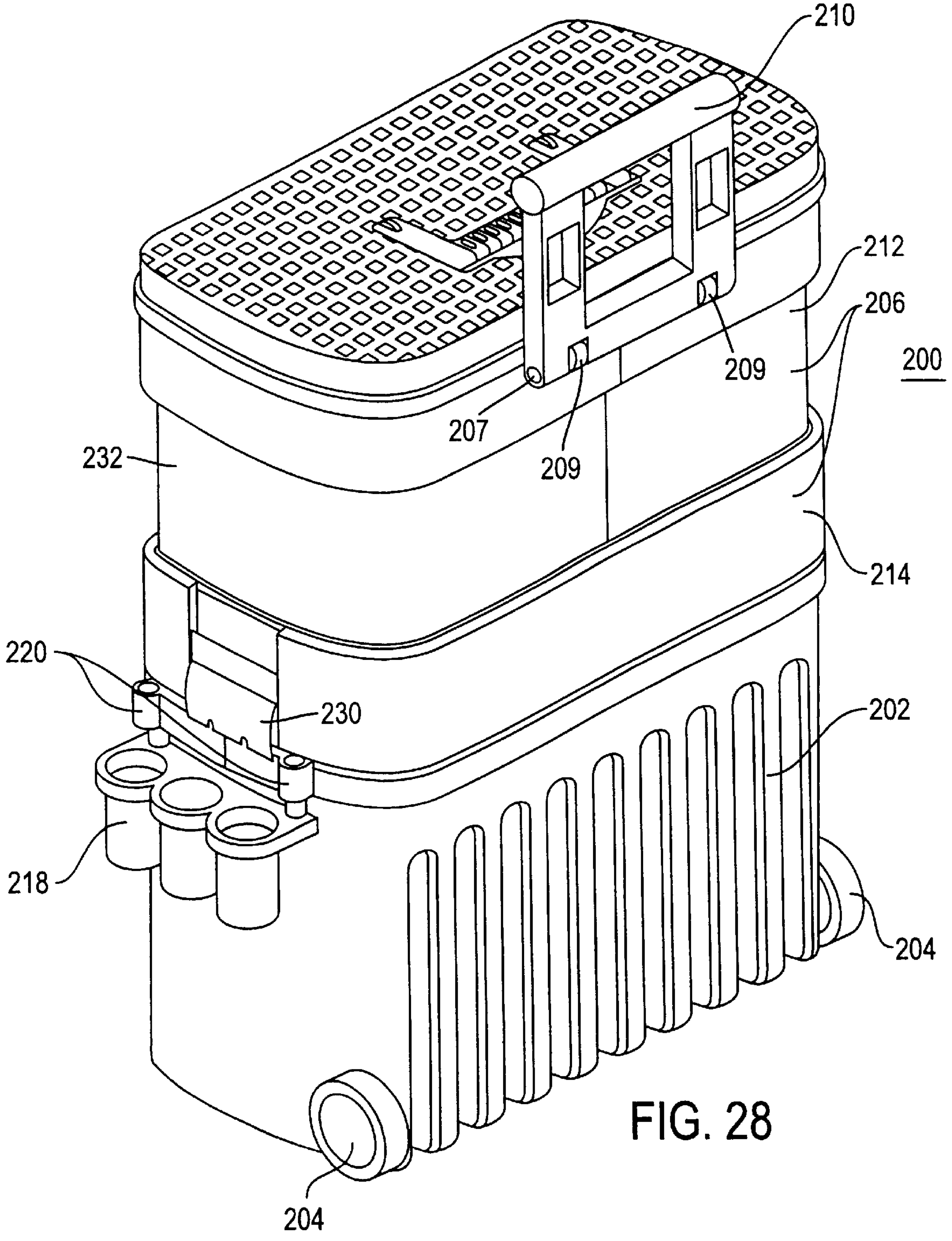
Figure 29:
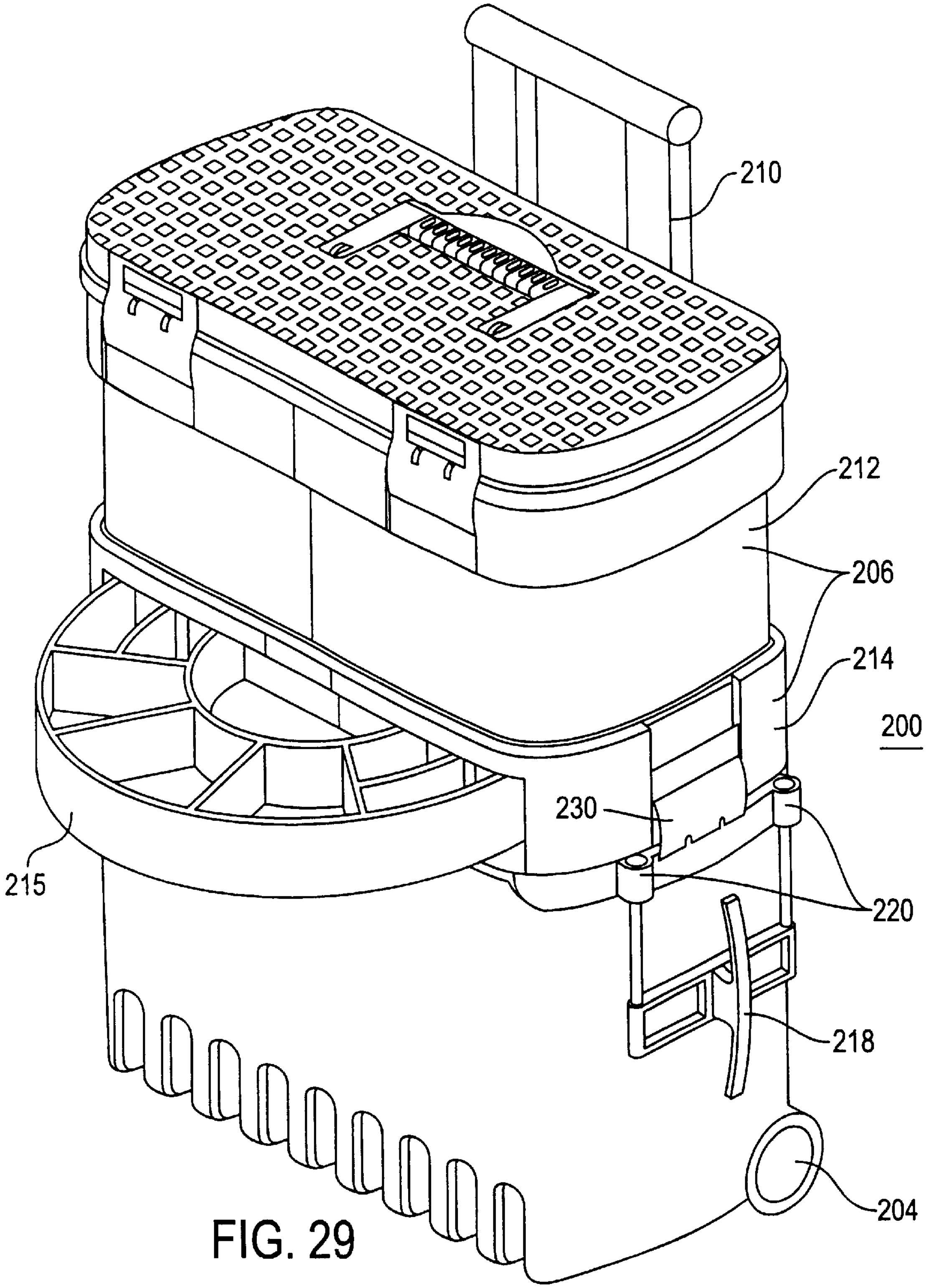
Figure 30A:
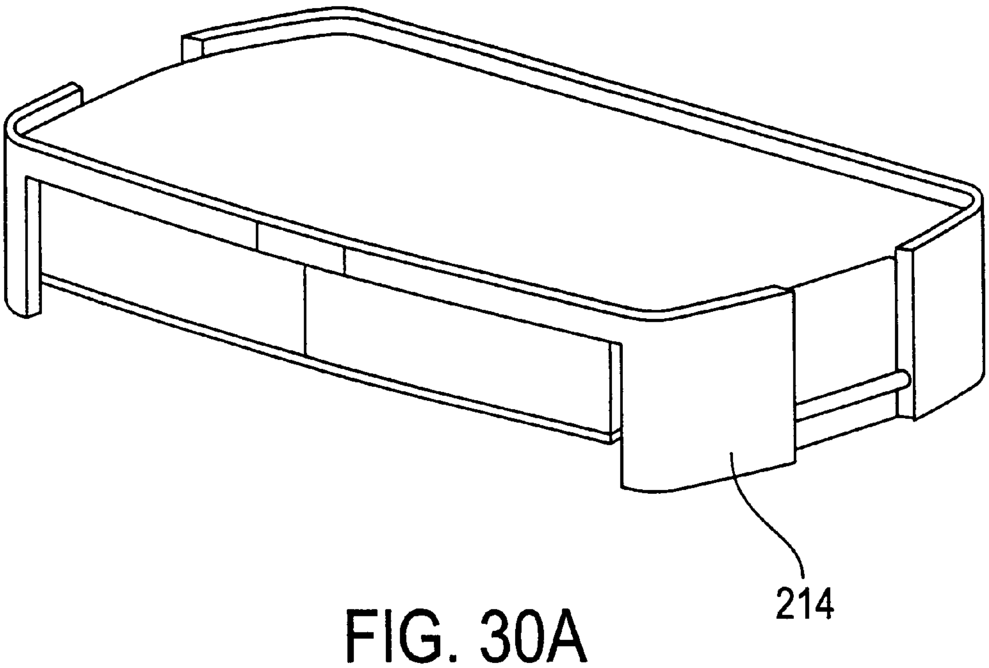
FIGS. 30*a* and 30*b* are perspective views of an organizer of the rolling containers assembly according to its second embodiment.
Figure 30B:
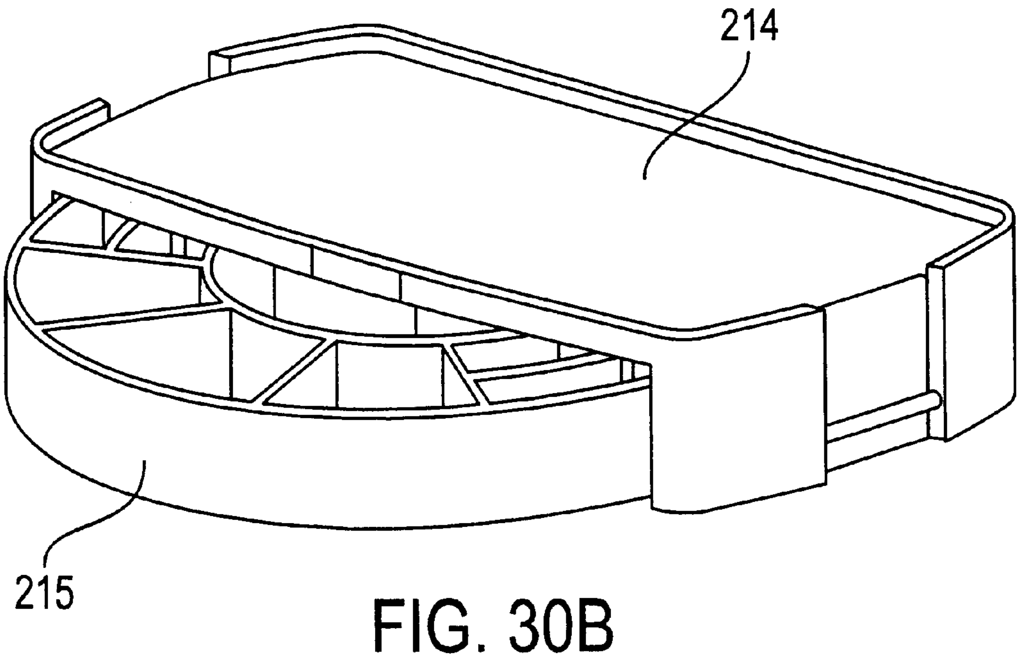

As best seen in FIGS. 26*a–b* two protrusions 164 formed in recession 140 of casing 126 are camming into corresponding holes 162 formed in backplate 156, serving to lock/unlock plate 156 to assembly 50 by a quarter of a turn.

Back plate 156 is supplemented with a lever 166. Lever 166 is positioned such that when plate 156 is in its locked position, lever is pulled over a dedicated protrusion 167 (best seen in FIG. 2), formed in casing 126, thereby securing reel 64 in its locked position, such that inadvertent disconnection of reel 64 from base cabinet 52 becomes practically impossible.

Reel 64 is preferably further supplemented with a revolving handle 170 asymmetrically attached to front plate 152 for releasing a cord engaged thereon.

FIGS. 27–31 show another embodiment of the rolling containers assembly according to the present invention, which is referred to hereinbelow as assembly 200.

Like assembly 50, assembly 200 includes a base cabinet 202 which is supplemented with wheels 204 for locomoting rolling containers assembly 200.

Assembly 200 further includes at least one additional cabinet or removable container (these terms being used interchangeably) 206 which is removably connectable (by snapping) on top 208 of base cabinet 202.

Additional cabinet 206 includes a pulling handle 210 for effecting locomotion. The pulling handle 210 has a hand grip portion 211.

Figure 32:
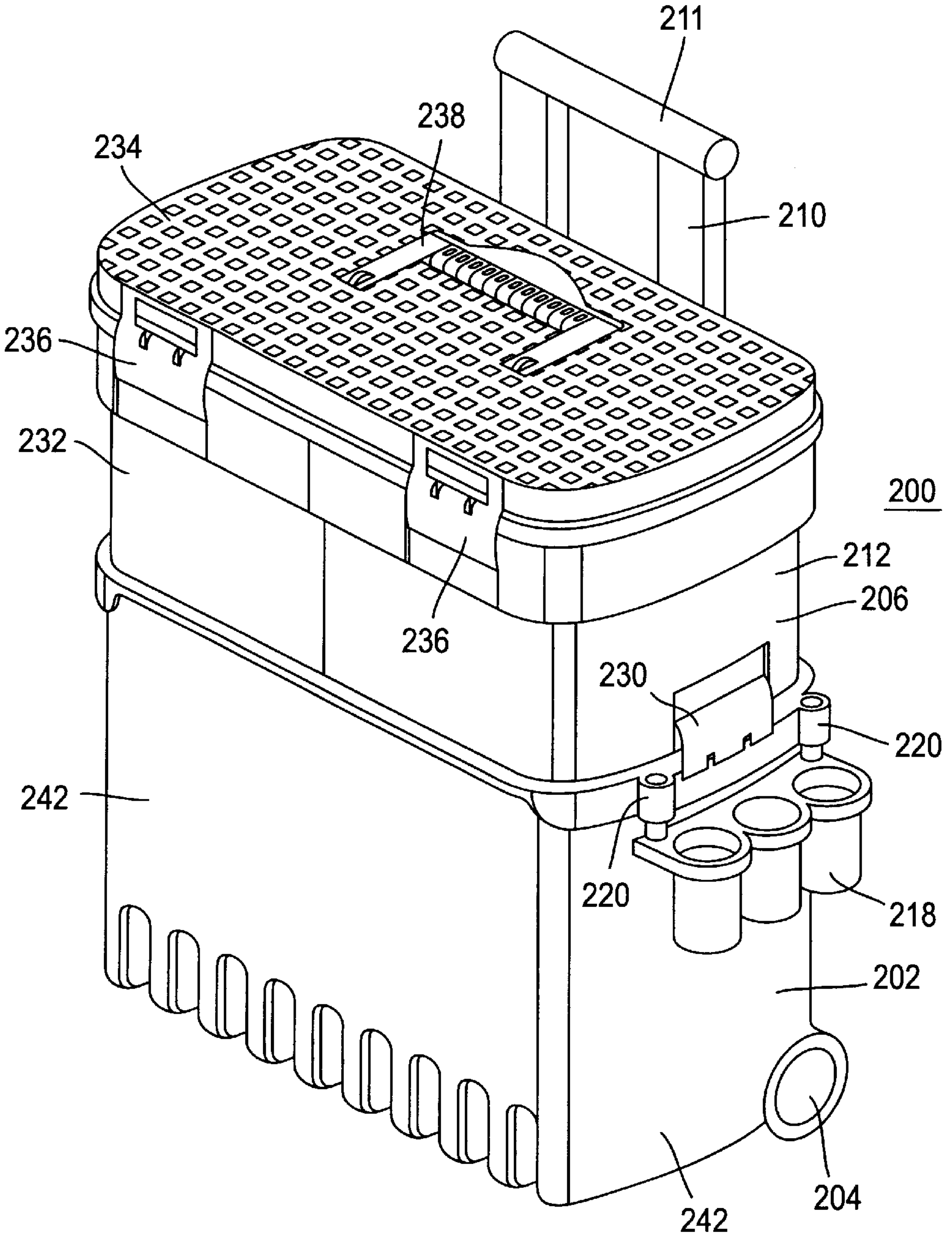
FIG. 32 illustrates a removable container in the form of a clamshell style tool case.

According to a preferred embodiment, additional cabinet 206 is a clamshell style case or toolbox 212 and/or a carousel organizer 214. FIG. 32 illustrates the removable container 206 as only the clamshell tool case 212.

Carousel organizer 214 includes a revolving drawer 215 which rotates radially about a fixed point and therefore allows for more complete access of contents than a conventional drawer, which is required to remain partially in the container.

In FIGS. 27, 28, 29 and 31, the at least one cabinet 206 includes both the clamshell style case or toolbox 212 and the carousel organizer 214, with the at least one cabinet 206 being secured to the base cabinet 202 by a latch or latch assembly 230 as shown. The tool case 212 is secured to the organizer 214 in any manner, for example, by a frictional fit as shown.

As further shown in the drawings, the toolbox or case 212 inclues a container portion 232 that has an upwardly facing opening (see FIG. 31) and defines an interior space in which articles can be stored and transported. Also shown in FIGS. 27, 28, 29, 31 and 32 is a lid portion 234 pivotally connected to container portion 232, and which is arranged to cover the upwardly facing opening of container portion 232. The lid portion 234 can be latched to container portion 232 by a pair of latches 236. A carrying handle 238 is pivotally attached to the lid portion 234 in conventional fashion and is manually graspable to enable carriage of the at least one removable container 206 separately from the base container 202.

Figure 31:
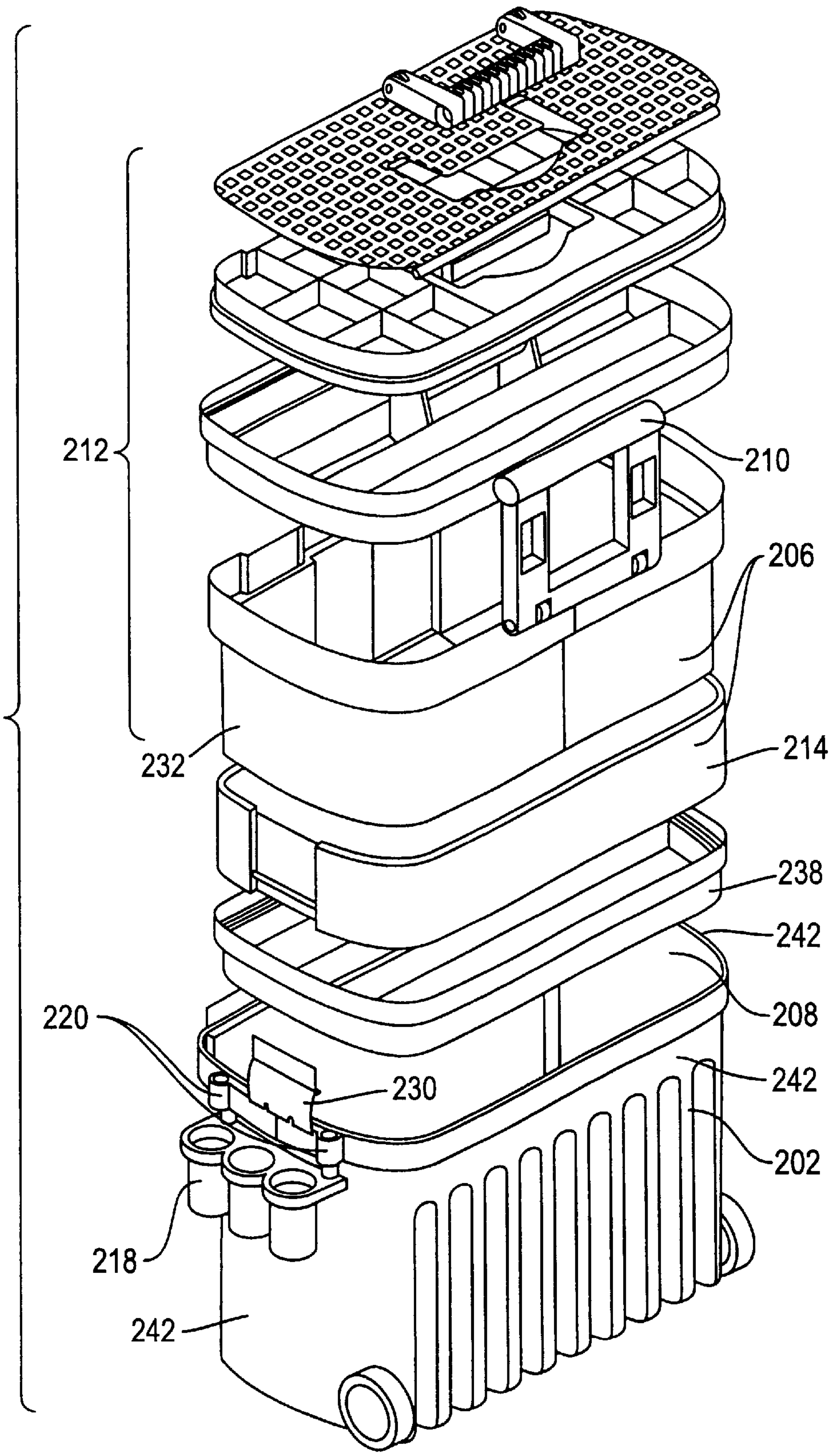
FIG. 31 is an exploded perspective view of the rolling containers assembly according to its second embodiment.

As seen best in FIG. 31, the toolbox 212 contains a conventional tool tray 238 as known in the art. Similarly, another tool tray 238 may be provided to sit within the base cabinet 202 as shown. As also shown, the base cabinet 202 has four substantially vertical walls 242 defining an upwardly facing opening to the base cabinet 202. The at least one additional cabinet 206 is secured above the opening of the base cabinet 202 as shown in the Figures.

It can be appreciated that the container portion 232 has its upwardly facing opening disposed in such upwardly facing orientation when the device 200 is in its substantially upright position, as illustrated in FIGS. 27–29, 31 and 32, thus permitting tools to be placed downwardly into such upwardly facing opening when the lid 234 is opened. In the closed position, the major portion of lid 234 is substantially horizontally disposed in covering relation to the opening of container portion 232.

According to a preferred embodiment base cabinet 202 includes accessories 218 anchor points 220. Accessories 218 may be of any type. Accessories 218 anchor points 220 serve as a custom attachment feature present on base cabinet 202 which allows various molded components with different functionality to be attached thereon to tune the product for specific purposes (e.g., fishing, gardening, etc.). In the embodiments shown, the accessory 218 has a relatively narrow portion adjacent to the base container and a relatively wider portion extending vertically in spaced relation from the base container. This can be used, for example, to wrap an extension cord therearound. Other features of assembly 200 are similar to those described hereinabove with respect to assembly 50.

According to a preferred embodiment of the invention all of the components of the rolling containers assembly are injected plastic components.

Thus, the present invention relates to improvements to toolboxes for industrial and home/hobby applications.

The rolling containers assembly according to the present invention is the first modular rolling workshop having a retractable/extendible handle system.

Breaking the assembly into three vertically modular components provides several functional advantages.

First, the total weight is dividable for purposes of lifting the assembly over steps, into car trunks, etc.

Second, the vertical configuration is ergonomically practical when accessing the assembly's interior.

Third, when disassembled the assembly according to the present invention is storable is small confinements, such as the trunk of an average sedan.

Finally, the modular vertical nature of the rolling containers assembly according to the present invention allows a user to take "as much as he needs".

Thus, for small jobs the toolcase or the toolcase and the drawers assembly can be deployed with the traditional side claw latches.

In any case, when the toolcase and drawers assembly are removed the remaining base cabinet and back handle transform into a dolly for additional load carrying.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An apparatus for transporting articles between working locations, comprising:

a base container having an interior space in which articles to be transported can be stored, one or more rotatable ground engaging wheels mounted to the apparatus toward the bottom of said apparatus for rotation about an axis to provide rolling support for said apparatus;

at least one removable container having (i) a container portion with an interior space in which articles to be transported can be stored, (ii) a lid pivotally connected to said container portion; (iii) a latch arrangement constructed to secure said lid in covering relation with respect to said container portion, and (iv) a carrying handle attached to said lid and that is manually graspable to enable carriage of said removable container;

said at least one removable container being removably secured above said base container when said apparatus is at a working location to enable said at least one container to be removed from secured relation above said base container and separately carried by said carrying handle at said working location; and a manually engageable pulling handle having a hand grip portion, said pulling handle and said one or more ground engaging wheels being arranged to enable a user to manually grasp said hand grip portion and pull said pulling handle generally rearwardly so as to tilt said apparatus rearwardly to a tilted rolling movement position, thereby enabling the user to roll said apparatus to a desired location by pushing or pulling said pulling handle in a desired direction;

said at least one removable container being secured above said base container so as to be retained in secured relation above said base container while said apparatus is in said tilted rolling movement position;

said container portion having a generally upwardly facing opening when said apparatus is standing at said working location and said at least one removable container is secured above said base container;

said lid being pivotable, when said apparatus is disposed at said working location and said at least one removable container is secured above said base container, between (i) a closed position wherein said lid is in covering relation with said upwardly facing opening of said container portion and (ii) an open position permitting access to the interior space of said container portion.

2. An apparatus according to claim 1, wherein the removable container is removably secured above said base container by a latch assembly.

3. An apparatus according to claim 2, wherein said latch assembly comprises a pair of latches connected on opposing sides of said base container, said latches being movable between latched positions wherein said latches engage the removable container to secure said removable container above said base container and unlatched positions out of engagement with the removable container to release said removable container.

4. An apparatus according to claim 3, wherein said latches engage the removable container in a snapping relation in the latched positions thereof.

5. An apparatus according to claim 3, wherein each of said latches engage within respective recesses formed in opposite sides of said at least one removable container in said latched positions thereof.

6. An apparatus according to claim 4, wherein said base container provides a bottom surface for engaging the ground to support said apparatus when said apparatus is standing at a desired location.

7. An apparatus for transporting articles between working locations comprising:

a base container having an interior space in which articles to be transported can be stored;

one or more ground engaging wheels mounted to the apparatus toward the bottom of said apparatus for rotation about an axis to enable said apparatus to be rollingly transported;

a toolbox having (i) a container portion with an interior space in which articles to be transported can be stored, said container portion having a generally upwardly facing opening, (ii) a lid pivotally mounted to an upper rearward portion of said container portion, said lid being pivotable between an open position permitting access into said container portion through said generally upwardly facing opening thereof and a closed position preventing access into said container portion through said generally upwardly facing opening thereof, (iii) a latch on a front side of said toolbox, said latch being capable of releasably latching said lid in said closed position thereof and (iv) a carrying handle mounted to said lid and manually graspable to enable carriage of said toolbox;

said toolbox being removably secured above said base container when said apparatus is at a working location to enable said toolbox to be removed from secured relation above said base container and separately carried by said carrying handle at said working location; and a manually engageable pulling handle having a hand grip portion, said pulling handle being movable between a storage position and a deployed position, said pulling handle extending upwardly from one side of said apparatus when in said deployed position, said one or more ground engaging wheels being arranged on said apparatus to enable a user to manually grasp said hand grip portion and pull said pulling handle in said deployed position thereof generally rearwardly so as to tilt said apparatus rearwardly to a tilted rolling movement position, thereby enabling the user to roll said apparatus to a desired location by pushing or pulling said pulling handle in a desired direction, said toolbox being secured above said base container so as to be retained in secured relation above said base container while said apparatus is in said tilted rolling movement position;

said container portion having a generally upwardly facing opening when said apparatus is standing at said working location and said toolbox is secured above said base container;

said lid being pivotable, when said apparatus is at said working location and said toolbox is secured above said base container, between (i) a closed position wherein said lid is in covering relation with said upwardly facing opening of said container portion and (ii) an open position wherein said lid is removed from said covering relation.

8. An apparatus according to claim 7, wherein the removable container is removably secured above said base container by a latch assembly comprising a pair of latches on opposing lateral sides of said apparatus securing said toolbox above said base container and being releasable to enable removal of said toolbox by said carrying handle.

9. An apparatus according to claim 7, wherein said base container provides a bottom surface for engaging the ground to support said apparatus when said apparatus is standing at a desired location.

10. An apparatus for transporting articles between working locations, comprising:

a base container having an interior space in which articles to be transported can be stored, said base container including four generally vertical walls defining an upwardly facing opening;

one or more ground engaging wheels mounted to the apparatus toward the bottom of said apparatus for rotation about an axis to enable said apparatus to be rollingly transported;

a toolbox having (i) a container portion with an interior space in which articles to be transported can be stored, said container portion having a generally upwardly facing opening, (ii) a lid pivotally mounted to an upper rearward portion of said container portion, said lid being pivotable between an open position permitting access into said container portion through said generally upwardly facing opening thereof and a closed position preventing access into container portion through said generally upwardly facing opening thereof, (iii) a latch on a front side of said toolbox, said latches releasably latching said lid in said closed position thereof and (iv) a carrying handle mounted to said lid and being manually graspable to enable carriage of said toolbox;

said toolbox being removably secured above the upwardly facing opening of said base container when said apparatus is at a working location to enable said toolbox to be removed from above said upwardly facing opening of base container and separately carried by said carrying handle at said working location;

a manually engageable pulling handle connected to said apparatus and arranged to enable a user to manually grasp and pull said pulling handle generally rearwardly so as to tilt said apparatus rearwardly to a tilted rolling movement position, thereby enabling the user to roll said apparatus to a desired location by pushing or pulling said pulling handle in a desired direction, and said container portion having a generally upwardly facing opening when said apparatus is standing at the working location and said toolbox is secured above said base container;

said toolbox being secured above said base container so as to be retained in secured relation above said base container while said apparatus is in said tilted rolling movement position;

said lid being pivotable, when said apparatus is at the working location and said toolbox is secured above said base container, between (i) a closed position wherein said lid is in covering relation with said upwardly facing opening of said container portion and (ii) an open position permitting access to the interior space of said container portion.

11. An apparatus according to claim 1, wherein the removable container is removably secured above said base container by a latch assembly comprising a pair of latches on opposing lateral sides of said apparatus securing said toolbox above said base container and being releasable to enable removal of said toolbox by said carrying handle.

12. An apparatus according to claim 10, wherein said base container provides a bottom surface for engaging the ground to support said apparatus when said apparatus is standing at a desired location.

13. An apparatus for transporting articles between working locations, comprising:

a base container having an interior space in which articles to be transported can be stored;

one or more ground engaging wheels mounted on the apparatus toward the bottom of said apparatus for rotation about an axis to enable said apparatus to be rollingly transported;

one or more removable container removably mounted in a stacked relation directly atop said base container, said one or more removable container comprising a toolbox having (i) a container portion with an interior space in which articles to be transported can be stored, said container portion having a generally upwardly facing opening, (ii) a lid pivotally mounted to said container portion, said lid being pivotable between an open position permitting access into said container portion through said generally upwardly facing opening thereof and a closed position preventing access into said container portion through said generally upwardly facing opening thereof, and (iii) a carrying handle mounted on said lid and enabling carriage of said toolbox;

said toolbox being removably mountable in a stacked relation directly atop of said base container when said apparatus is at a working location to enable said toolbox to be removed from atop of said base container and separately carried by said carrying handle at said working location; and a manually engageable pulling handle having a hand grip portion, said pulling handle and said one or more ground engaging wheels being arranged to enable a user to manually grasp said hand grip portion and pull said pulling handle generally rearwardly so as to tilt said apparatus rearwardly to a tilted rolling movement position, thereby enabling the user to roll said apparatus to a desired location by pushing or pulling said pulling handle in a desired direction, wherein said pulling handle is connected solely to said toolbox, said container portion having a generally upwardly facing opening when said one or more removable container is standing at a working location and said one or more removable container is mounted above said base container;

said one or more removable container being secured above said base container so as to be retained in secured relation above said base container while said apparatus is in said tilted rolling movement position;

said lid being pivotable when said apparatus is at a working location and said one or more removable container is mounted above said base container, between (i) a closed position wherein said lid is in covering relation with said upwardly facing opening of said container portion and (ii) an open position wherein said lid is removed from said covering relation.

14. An apparatus according to claim 13, wherein said base container provides a ground engaging surface for supporting said apparatus when said apparatus is standing at a desired location.

* * * * *

UNITED STATES PATENT AND TRADEMARK OFFICE
CERTIFICATE OF CORRECTION

PATENT NO. : 6,601,930 B2
DATED : August 5, 2003
INVENTOR(S) : Paolo B. Tiramani et al.

It is certified that error appears in the above-identified patent and that said Letters Patent is hereby corrected as shown below:

Column 14,
Line 47, replace "11. An apparatus according to claim 1, wherein the ..." with
-- 11. An apparatus according to claim 10, wherein the ... --

Signed and Sealed this

Third Day of May, 2005

JON W. DUDAS
*Director of the United States Patent and Trademark Office*

US006601930C1

(12) EX PARTE REEXAMINATION CERTIFICATE (8168th)

United States Patent

Tiramani et al.

(10) Number: US 6,601,930 C1

(45) Certificate Issued: Apr. 19, 2011

(54) ROLLING CONTAINERS ASSEMBLY

(75) Inventors: Paolo B. Tiramani, Greenwich, CT (US); Soohyun Ham, Stamford, CT (US); John A. Bozak, Greenwich, CT (US)

(73) Assignee: 500 Group Inc., Greenwich, CT (US)

Reexamination Request:
No. 90/008,998, Jan. 24, 2008

Reexamination Certificate for:

| | |
|---|---|
| Patent No.: | **6,601,930** |
| Issued: | **Aug. 5, 2003** |
| Appl. No.: | **10/075,441** |
| Filed: | **Feb. 15, 2002** |

Certificate of Correction issued May 3, 2005.

Related U.S. Application Data

(63) Continuation of application No. 09/731,780, filed on Dec. 8, 2000, now Pat. No. 6,347,847, which is a continuation of application No. 09/433,352, filed on Nov. 4, 1999, now Pat. No. 6,176,559, which is a continuation of application No. 09/017,197, filed on Feb. 2, 1998, now abandoned.

(51) Int. Cl.
*A47B 87/02* (2006.01)
*B62B 1/26* (2006.01)

(52) U.S. Cl. ........................ 312/108; 312/902; 312/244; 312/237; 312/249.1; 190/18 A; 280/47.19; 280/47.35

(58) Field of Classification Search ........................ None
See application file for complete search history.

(56) References Cited

U.S. PATENT DOCUMENTS

| | | | | | |
|---|---|---|---|---|---|
| 1,984,345 A | * | 12/1934 | Kennedy | .................... | 312/290 |
| D237,121 S | * | 10/1975 | Metzner | ...................... | D3/284 |
| 4,118,048 A | | 10/1978 | Spranger | | |
| 5,518,139 A | | 5/1996 | Trower | | |
| 6,601,930 B2 | | 8/2003 | Tiramani | | |

FOREIGN PATENT DOCUMENTS

| | | |
|---|---|---|
| DE | 78 28 640 U1 | 4/1979 |
| DE | 351307 A1 | 9/1986 |
| EP | 0555533 B1 | 8/1993 |

OTHER PUBLICATIONS

Merriam–Webster's Collegiate Dictionary, $10^{th}$ ed., p. 1056.*
English translation of New Claims for German Application No. 299 23 856.
English Translation of German PTO Decision File No. Gbm 299 23 856.

* cited by examiner

*Primary Examiner*—Jeffrey L. Gellner

(57) ABSTRACT

A rolling containers assembly including (a) a base cabinet including wheels and a pulling handle for locomoting the rolling containers assembly; and (b) at least one additional cabinet being removably connectable on top of the base cabinet.

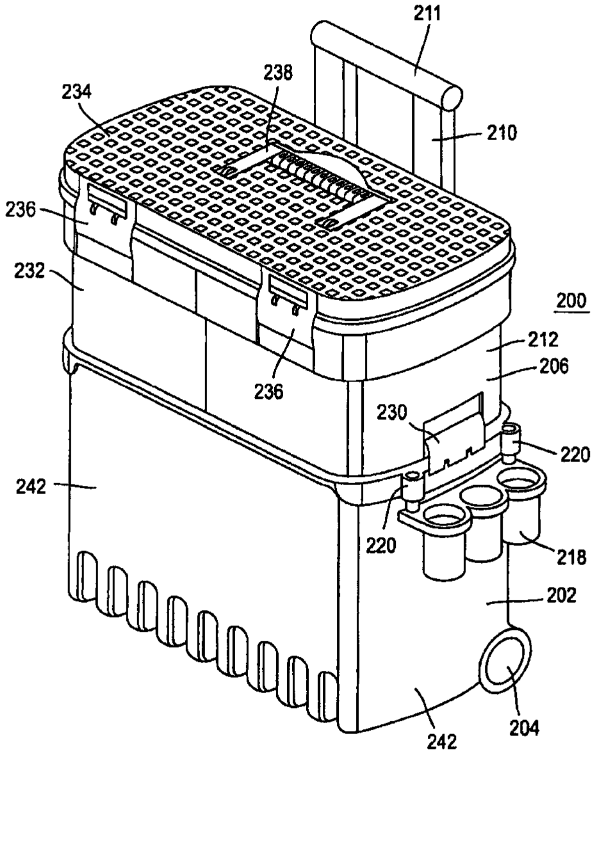

EX PARTE REEXAMINATION CERTIFICATE ISSUED UNDER 35 U.S.C. 307

THE PATENT IS HEREBY AMENDED AS INDICATED BELOW

AS A RESULT OF REEXAMINATION, IT HAS BEEN DETERMINED THAT:

The patentability of claim 13 is confirmed.

Claims 1, 7 and 10 are cancelled.

Claims 2-6, 8, 9, 11, 12 and 14 were not reexamined.

* * * * *